(12) United States Patent
Lee

(10) Patent No.: US 11,029,499 B2
(45) Date of Patent: Jun. 8, 2021

(54) FISHEYE LENS ASSEMBLY, AND ELECTRONIC DEVICE COMPRISING SAME

(71) Applicant: Samsung Electronics Co., Ltd., Suwon-si (KR)

(72) Inventor: Yong-jae Lee, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 137 days.

(21) Appl. No.: 16/331,812

(22) PCT Filed: Jun. 27, 2017

(86) PCT No.: PCT/KR2017/006755
§ 371 (c)(1),
(2) Date: Mar. 8, 2019

(87) PCT Pub. No.: WO2018/056555
PCT Pub. Date: Mar. 29, 2018

(65) Prior Publication Data
US 2019/0250382 A1 Aug. 15, 2019

(30) Foreign Application Priority Data
Sep. 21, 2016 (KR) .................. 10-2016-0120749

(51) Int. Cl.
*G02B 13/06* (2006.01)
*G02B 9/64* (2006.01)
(Continued)

(52) U.S. Cl.
CPC ............. *G02B 13/06* (2013.01); *G02B 7/021* (2013.01); *G02B 7/105* (2013.01); *G02B 9/62* (2013.01);
(Continued)

(58) Field of Classification Search
None
See application file for complete search history.

(56) References Cited

U.S. PATENT DOCUMENTS

| 6,867,933 B2 | 3/2005 | Matsusaka |
| 7,554,753 B2 | 6/2009 | Wakamiya |

(Continued)

FOREIGN PATENT DOCUMENTS

| JP | 2005-010521 A | 1/2005 |
| JP | 2006-011093 A | 1/2006 |

(Continued)

OTHER PUBLICATIONS

European Search Report dated Aug. 5, 2019, issued in the European Application No. 17853269.3.
(Continued)

*Primary Examiner* — Darryl J Collins
(74) *Attorney, Agent, or Firm* — Jefferson IP Law, LLP

(57) ABSTRACT

A fisheye lens assembly and an electronic apparatus are disclosed. The fisheye lens has an angle of view of 150° or more, includes a plurality of lenses including an aspherical lens having an inflection point on one surface or both surfaces thereof, and satisfies the expression 35 μm≤SAG_MAX, where SAG_MAX denotes a maximum value of absolute values of SAG values of inflection points of the aspherical lens.

12 Claims, 14 Drawing Sheets

(51) Int. Cl.
*G02B 7/105* (2021.01)
*G02B 7/02* (2021.01)
*G02B 9/62* (2006.01)
*H04N 5/225* (2006.01)
*H04N 5/232* (2006.01)

(52) U.S. Cl.
CPC .............. *G02B 9/64* (2013.01); *H04N 5/2254* (2013.01); *H04N 5/23238* (2013.01)

(56) References Cited

U.S. PATENT DOCUMENTS

| | | | |
|---|---|---|---|
| 7,869,141 B2 | 1/2011 | Ning | |
| 7,933,078 B2 | 4/2011 | Jung et al. | |
| 8,248,715 B2 | 8/2012 | Asami et al. | |
| 9,316,808 B1 | 4/2016 | Hudyma et al. | |
| 2013/0155528 A1 | 6/2013 | Tsai et al. | |
| 2014/0092293 A1* | 4/2014 | Chen | G02B 9/34 348/335 |
| 2014/0218597 A1* | 8/2014 | Lee | G02B 13/0045 348/360 |
| 2015/0138545 A1 | 5/2015 | Day et al. | |
| 2015/0205073 A1* | 7/2015 | Lee | G02B 9/60 359/714 |
| 2016/0187625 A1 | 6/2016 | Lin | |
| 2017/0184822 A1* | 6/2017 | Shi | G02B 27/0025 |
| 2018/0136443 A1* | 5/2018 | Yin | G02B 27/0025 |

FOREIGN PATENT DOCUMENTS

| | | |
|---|---|---|
| JP | 2007-155976 A | 6/2007 |
| JP | 2008-134535 A | 6/2008 |
| JP | 2010-160479 A | 7/2010 |
| JP | 2013-003544 A | 1/2013 |
| JP | 2013-073152 A | 4/2013 |
| JP | 5650080 B2 | 1/2015 |
| KR | 10-0657377 B1 | 12/2006 |

OTHER PUBLICATIONS

International Search Report dated Sep. 13, 2017, issued in the International Application No. PCT/KR2017/006755.

* cited by examiner

FISHEYE LENS ASSEMBLY, AND ELECTRONIC DEVICE COMPRISING SAME

TECHNICAL FIELD

The present disclosure relates to a fisheye lens assembly and an electronic apparatus having the same, for example, to a fisheye lens assembly having a small size and excellent optical performance and an electronic apparatus having the same.

BACKGROUND ART

Various services and additional functions provided by electronic apparatuses have been gradually expanded. An electronic apparatus, e.g., a mobile device or user equipment, may provide various services through various sensor modules. An electronic apparatus may provide a multimedia service, e.g., a photograph service or a video service. In accordance with an increase in the use of electronic apparatuses, the use of cameras functionally connected to electronic apparatuses has also gradually increased. Due to user demand, the performance, resolution, and/or the like of cameras in electronic apparatuses have been improved. Various types of scenery, people, or self-shots may be taken by using a camera in an electronic apparatus. In addition, such multimedia, e.g., photographs or videos, may be shared with a social network site, other media, or the like.

DESCRIPTION OF EMBODIMENTS

Technical Problem

Provided is a fisheye lens assembly having an angle of view of 150° or more in, for example, an electronic apparatus (e.g., a portable terminal).

Provided is an electronic apparatus including, for example, a fisheye lens assembly having an angle of view of 150° or more.

Provided is an electronic apparatus capable of omni-directionally capturing images with, for example, a plurality of fisheye lens assemblies.

Solution to Problem

According to an aspect of the present disclosure, a fisheye lens assembly includes a plurality of lenses sequentially arranged from an object side to an image sensor side and has an angle of view of 150° or more, wherein the plurality of lenses include an aspherical lens having an inflection point on one surface or both surfaces thereof, and the aspherical lens is located closest to the image sensor side among the plurality of lenses and satisfies the expressions 35 µm≤SAG_MAX, 1.4≤Nd≤1.7, and 10≤Abv≤60, where SAG_MAX denotes a maximum value of absolute values of SAG values of inflection points of the aspherical lens, Nd denotes a refractive index, and Abv denotes an Abbe number.

Advantageous Effects of Disclosure

According to various embodiments, a fisheye lens assembly may have, for example, a small size and an angle of view of 150° or more. According to various embodiments, the fisheye lens assembly may allow aberration to be easily corrected by appropriately distributing refractive power of lenses.

In addition, according to various embodiments, an electronic apparatus may include the fisheye lens assembly and capture multimedia (e.g., photographs, videos, or the like) at a super wide angle and with high performance. For example, according to various embodiments, an electronic apparatus may perform omni-directional image capturing with a plurality of fisheye lens assemblies.

BEST MODE

Figure 1:
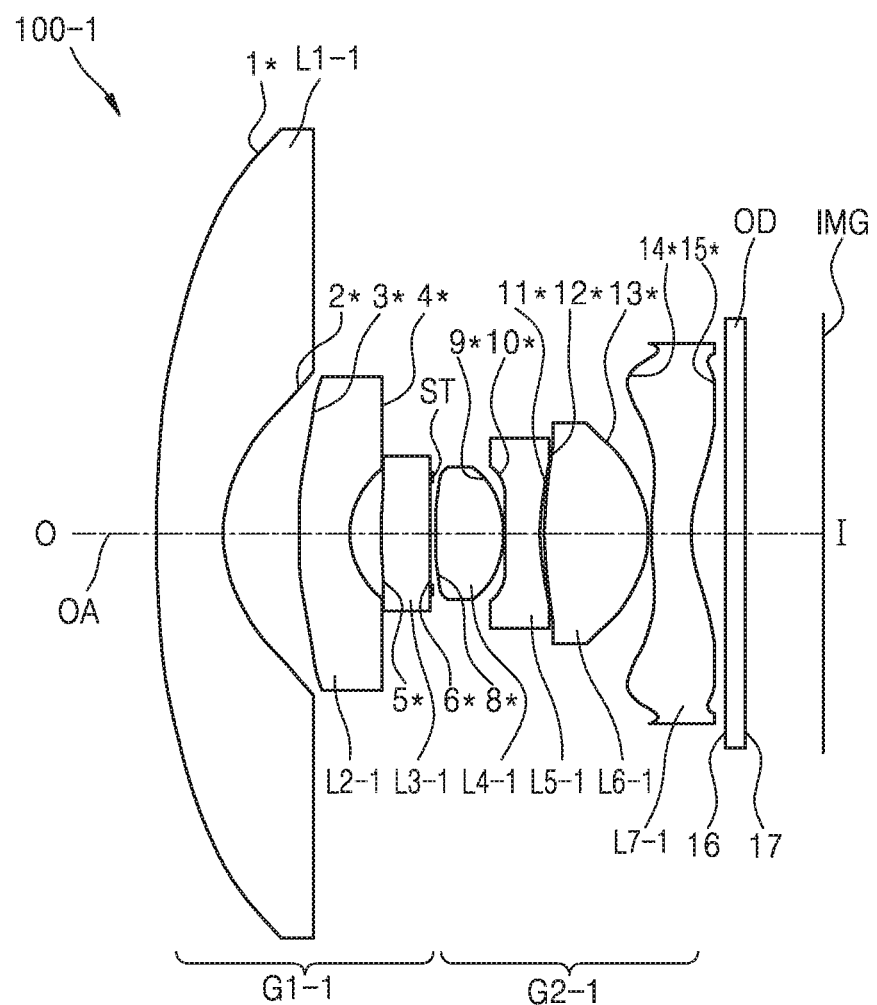
FIG. 1 illustrates a fisheye lens assembly according to an embodiment of a first numerical value among various embodiments.

According to an aspect of the present disclosure, a fisheye lens assembly includes a plurality of lenses sequentially arranged from an object side to an image sensor side and has an angle of view of 150° or more, wherein the plurality of lenses include an aspherical lens having an inflection point on one surface or both surfaces thereof, and the aspherical lens is located at the most image sensor side among the plurality of lenses and satisfies expressions below 35 µm≤SAG_MAX, 1.4≤Nd≤1.7, and 10≤Abv≤60, where SAG_MAX denotes a maximum value of absolute values of SAG values of inflection points of the aspherical lens, Nd denotes a refractive index, and Abv denotes an Abbe number.

The fisheye lens assembly may satisfy an expression below 1.5≤TL/Y≤6, where TL denotes a distance from an object-side surface of a lens located at the most object side among the plurality of lenses to an image plane of an image sensor, and Y denotes an image height.

The plurality of lenses may include a front group, an iris, and a rear group sequentially arranged from the object side to the image sensor side, the front group may sequentially include a first lens having negative refractive power and a second lens having negative refractive power from the object side, and the rear group may include the aspherical lens.

The front group may further include a third lens provided closer to the image sensor side than the second lens and having positive refractive power, the rear group may further sequentially include a fourth lens having positive refractive power, a fifth lens having negative refractive power, and a sixth lens having positive refractive power from the object side, and the aspherical lens may be provided closer to the image sensor side than the sixth lens.

The fisheye lens assembly may satisfy an expression below $0.5 \leq TL\_f/TL\_r \leq 1.25$, where $TL\_f$ denotes a distance from an object-side surface of a lens located at the most object side in the front group to an image plane-side surface of a lens located at the most image sensor side in the front group, and $TL\_r$ denotes a distance from an object-side surface of a lens located at the most object side in the rear group to an image plane-side surface of a lens located at the most image sensor side in the rear group.

The rear group may further include a lens provided closer to the object side than the aspherical lens and having positive refractive power and satisfy an expression below $1.25 \leq CT\_A/CT\_B \leq 4$, where $CT\_A$ denotes a central thickness of the lens having positive refractive power, and $CT\_B$ denotes a central thickness of the aspherical lens.

The front group may include at least three lenses, and the rear group may include at least three lenses.

The fisheye lens assembly may include a driver configured to move all of the plurality of lenses or move the plurality of lenses excluding the first lens when focusing.

The fisheye lens assembly may further include a sensor configured to sense a change in a temperature, wherein the driver corrects focusing according to the change in the temperature sensed by the sensor.

The first lens and the second lens may have a meniscus shape convex toward the object side.

The fisheye lens assembly may further include an optical device between the aspherical lens and the image sensor.

All of the plurality of lenses may be aspherical lenses.

MODE OF DISCLOSURE

Hereinafter, various embodiments of the present document are described with reference the accompanying drawings. However, it should be understood that the description made in the present document is not limited to a specific implementation form but includes various modifications, equivalents, and/or alternatives of the embodiments of the present document. In the description of the drawings, like reference numbers are used to refer to like elements.

In the present document, the expression such as "have", "may have", "include", or "may include" indicate the existence of a corresponding feature (e.g., a numeric value, a function, an operation, or an element such as a part) and does not exclude the existence of an additional feature.

In the present document, the expression such as "A or B", "at least one of A and/or B", or "one or more of A and/or B" may include all possible combinations of items listed together. For example, "A or B", "at least one of A and B", or "at least one of A or B" may refer to any of (1) including at least one A, (2) including at least one B, or (3) including both at least one A and at least one B.

In the present document, the expressions such as "first" and "second" may be used to describe various elements regardless of order and/or importance and are used to classify a certain element from another element, and the elements are not limited by the expressions. For example, a first user equipment and a second user equipment may indicate different user equipments regardless of order or importance. For example, a first element can be named a second element without leaving from the right scope described in the present document, and likely the second element can be named the first element.

When it is described that a certain element (e.g., a first element) is "(operatively or communicatively) coupled with/to" or "connected to" another element, it should be understood that the certain element may be connected to another element directly or via another element (e.g., a third element) in the middle. However, when it is described that a certain element (e.g., a first element) is "directly coupled with/to" or "directly connected to" another element, it will be understood that another element (e.g., a third element) does not exist between the certain element and another element.

The expression "configured to" used in the present document may be replaced by, for example, "suitable for", "having the capacity to", "designed to", "adapted to", "made to", or "capable of" in accordance with circumstances. The term "configured to" may not necessarily indicate only "specifically designed to" in terms of hardware. Instead, the expression "a device configured to" may indicate that the device "capable of" with another device or parts in a certain circumstance. For example, the wording "a processor configured to perform A, B, and C" may indicate an exclusive processor (e.g., an embedded processor) for performing a corresponding operation or a generic-purpose processor (e.g., a central processing unit (CPU) or an application processor) capable of performing corresponding operations by executing one or more software programs stored in a memory device.

The terminology used in the present document is used only to describe specific embodiments and may not have any intention to limit the inventive concept. An expression in the singular includes an expression in the plural unless they are clearly different from each other in context. All terms used herein including technical or scientific terms have the same meaning as those generally understood by those of ordinary skill in the art to which the present document belongs. It may be understood that terms generally used, which are defined in a dictionary, in the present document have the same or similar meaning as in context of related technology, and the terms are not to be understood as having an ideal or excessively formal meaning unless they are clearly defined in the present document. In accordance with circumstances, it cannot be understood that even terms defined in the present document exclude the embodiments in the present document.

An electronic apparatus, according to various embodiments of the present document, may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, mobile medical equipment, a camera, or a wearable device. According to various embodiments, the wearable device may include at least one of an accessory-type device (e.g., a watch, a ring, a bracelet, an anklet, a necklace, glasses, a contact lens, or a head-mounted-device (HMD)), a fabric or cloth integrated-type device (e.g., electronic cloths), a body attachment-type device (e.g., a skin pad or a tattoo), or a bioimplant-type device (e.g., an implantable circuit).

According to some embodiments, the electronic apparatus may be a home appliance. The home appliance may include at least one of, for example, a television (TV), a digital video disk (DVD) player, an audio player, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™, PlayStation™), an electronic dictionary, an electronic key, a camcorder, or an electronic frame.

According to other embodiments, the electronic apparatus may include at least one of various types of medical equipment (e.g., various portable medical measuring instruments (a glucometer, a cardiotachometer, a sphygmomanometer, a thermometer, or the like), magnetic resonance angiography (MRA), magnetic resonance imaging (MRI), or computed tomography (CT) machine, an ultrasonic machine, or the like), a navigation machine, a satellite navigation system (a global navigation satellite system (GNSS)), an event data recorder (EDR), a flight data recorder (FDR), a vehicle infotainment device, vessel electronic equipment (e.g., a vessel navigation machine, a gyrocompass, or the like), avionics, a security device, a vehicle head unit, an industrial or home robot, an automatic teller's machine (ATM) of a financial institution, a point of sales (POS) of a shop, or an Internet of Things (IoT) device (e.g., a light bulb, various kinds of sensors, an electric or gas meter, a sprinkler device, a fire alarm, a thermostat, a streetlight, a toaster, fitness equipment, a geyser, a heater, a boiler, or the like).

According to some embodiments, the electronic apparatus may include at least one of a part of furniture or a building/structure, an electronic board, an electronic signature receiving device, a projector, or various types of measuring devices (e.g., a water, electricity, gas, or electronic wave measuring device). According to various embodiments, the electronic apparatus may include the various devices described above, taken alone or in combination. According to a certain embodiment, the electronic apparatus may be a flexible electronic apparatus. In addition, the electronic apparatus, according to an embodiment of the present document is not limited to the devices described above and may include a noble electronic apparatus according to the development of technology.

Hereinafter, when a configuration of each lens is described, an image side may indicate, for example, a direction of an image plane IMG on which an image is formed, and an object side may indicate a direction of an object. In addition, "object-side surface" of a lens may indicate, for example, a lens surface at a side of an object based on an optical axis OA, i.e., a left surface in the drawings, and "image-side surface" may indicate a lens surface at a side of the image plane based on the optical axis, i.e., a right surface in the drawings. The image plane IMG may be, for example, an image pick-up element surface or an image sensor surface. An image sensor may include, for example, a sensor such as a complementary metal oxide semiconductor (CMOS) image sensor or a charge coupled device (CCD). The image sensor is not limited thereto and may be, for example, an element configured to convert an image of an object into an electrical image signal.

Hereinafter, an electronic apparatus according to various embodiments will be described with reference to the accompanying drawings. In the present document, the term "user" may indicate a person who uses the electronic apparatus or a device which uses the electronic apparatus (e.g., an artificial intelligence (AI) electronic apparatus).

Hereinafter, a fisheye lens assembly and an electronic apparatus including the same, according to various embodiments, will be described in detail with reference to the accompanying drawings.

FIG. 1 illustrates a fisheye lens assembly 100-1 according to a first numeric value embodiment of various embodiments. The fisheye lens assembly 100-1 according to various embodiments may include a front group G1-1 and a rear group G2-1 arranged from an object side O to an image side I.

The front group G1-1 may include a plurality of lenses arranged from the object side O to the image side I. For example, the front group G1-1 may include three or more lenses. According to various embodiments, the front group G1-1 may include a first lens L1-1, a second lens L2-1, and a third lens L3-1 arranged from the object side O to the image side I.

The first lens L1-1 may have negative refractive power. The first lens L1-1 may have, for example, an object-side surface 1* convex toward the object side O. The first lens L1-1 may have, for example, an image-side surface 2* convex toward the object side O. The first lens L1-1 may have, for example, a meniscus shape convex toward the object side O.

The second lens L2-1 may have negative refractive power. The second lens L2-1 may have, for example, an object-side surface 3* convex toward the object side O. The second lens L2-1 may have, for example, an image-side surface 3* convex toward the object side O. The second lens L2-1 may have, for example, a meniscus shape convex toward the object side O. According to various embodiments, a diameter of the first lens L1-1 may be greater than that of the second lens L2-1. Because the first lens L1-1 and the second lens L2-1 are meniscus lenses having negative refractive power, the fisheye lens assembly may have a reduced total length while ensuring an angle of view of 150° or more.

The third lens L3-1 may have positive refractive power. The third lens L3-1 may have, for example, an object-side surface 5* convex toward the object side O. The third lens L3-1 may have, for example, an image-side surface 6* concave toward the object side O. The third lens L3-1 may have, for example, a biconvex shape.

When the front group G1-1 includes an aspherical lens, the front group G1-1 may ensure the performance even with a small number of lenses. According to various embodiments, the first lens L1-1, the second lens L2-1, and the third lens L3-1 may be aspherical lenses. The first lens L1-1, the second lens L2-1, and the third lens L3-1 may be plastic lenses.

The rear group G2-1 may include a fourth lens L4-1, a fifth lens L5-1, a sixth lens L6-1, and a seventh lens L7-1.

The fourth lens L4-1 may have positive refractive power. The fourth lens L4-1 may have, for example, an object-side surface 8* convex toward the object side O. The fourth lens L4-1 may have, for example, an image plane-side surface 9* concave toward the object side O. The fourth lens L4-1 may have, for example, a biconvex shape.

The fifth lens L5-1 may have negative refractive power. The fifth lens L5-1 may have, for example, an object-side surface 10* concave toward the object side O. The fifth lens L5-1 may have, for example, an image plane-side surface 11* convex toward the object side O. The fifth lens L5-1 may have, for example, a biconcave shape.

The sixth lens L6-1 may have positive refractive power. The sixth lens L6-1 may have, for example, an object-side surface 12* convex toward the object side O. The sixth lens L6-1 may have, for example, an image plane-side surface 13* concave toward the object side O. The sixth lens L6-1 may have, for example, a biconvex shape.

The seventh lens L7-1 may have at least one lens surface having at least one inflection point. The inflection point may indicate a point where a sign of a radius of curvature changes from + to − or from − to +. Alternatively, the inflection point may indicate a point where a lens shape changes from convex to concave or from concave to convex. The seventh lens L7-1 may have, for example, a meniscus shape in which a central part of a lens surface (within a certain radius from the optical axis OA) is convex toward the object side O. For example, an image plane-side surface 15* of the seventh lens L7-1 may have a concave shape around the optical axis OA based on the image side I and have a shape of being convex from the optical axis OA toward an edge part. For example, an object-side surface 14* of the seventh lens L7-1 may have a convex shape around the optical axis OA based on the object side O and have a shape of being concave from the optical axis OA toward the edge part.

The rear group G2-1 may include three or more lenses. When the rear group G2-1 includes an aspherical lens, the rear group G2-1 may ensure the performance even with a small number of lenses. Because the seventh lens L7-1 located at the most image sensor side is an aspherical lens including an inflection point, the rear group G2-1 may ensure the performance of aberration correction and astigmatism even with a configuration including a small number of lenses. According to various embodiments, the rear group G2-1 may include the fourth lens L4-1, the fifth lens L5-1, the sixth lens L6-1, and the seventh lens L7-1 which are aspherical lenses. For example, the fourth lens L4-1, the fifth lens L5-1, the sixth lens L6-1, and the seventh lens L7-1 may be plastic lenses.

At least one optical device OD may be provided between the seventh lens L7-1 and the image plane IMG. The optical device OD may include, for example, at least one of a low pass filter, an infrared (IR)-cut filter, or cover glass. For example, when an IR-cut filter is provided as the optical device OD, visible light may pass therethrough, and IR rays may be reflected to the outside, such that the IR rays do not reach the image plane. However, the fisheye lens assembly may be configured without the optical device OD.

According to various embodiments, an iris ST may be provided between the front group G1-1 and the rear group G2-1. The iris ST is to adjust a diameter of an optical flux and may include, for example, an opening iris, a variable iris, a mask-shaped stop, or the like.

Figure 5:
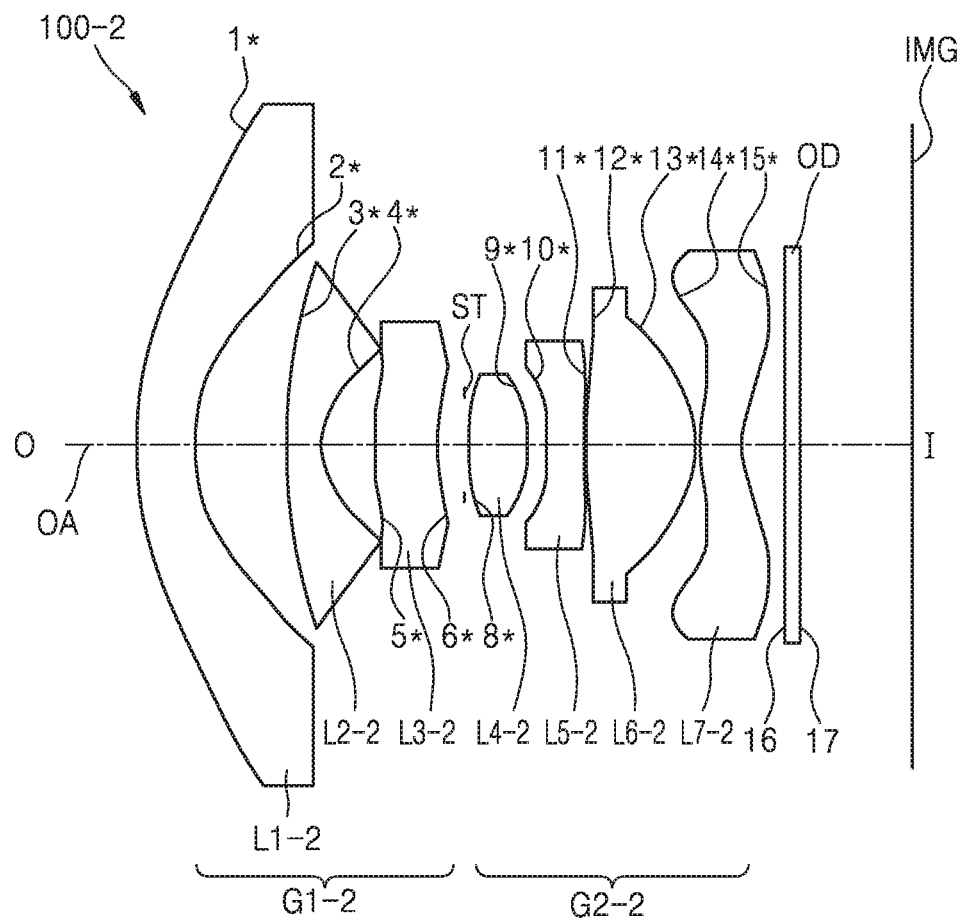
FIG. 5 illustrates a fisheye lens assembly according to an embodiment of a second numerical value among various embodiments.

FIG. 5 illustrates a fisheye lens assembly 100-2 according to a second numeric value embodiment of various embodiments. The fisheye lens assembly 100-2 according to various embodiments may include a front group G1-2 and a rear group G2-2 arranged from the object side O to the image side I.

The front group G1-2 may include a plurality of lenses arranged from the object side O to the image side I. According to various embodiments, the front group G1-2 may include a first lens L1-2, a second lens L2-2, and a third lens L3-2 arranged from the object side O to the image side I.

The first lens L1-2 may have negative refractive power. The first lens L1-2 may have, for example, the object-side surface 1* convex toward the object side O. The first lens L1-2 may have, for example, the image-side surface 2* convex toward the object side O. The first lens L1-2 may have, for example, a meniscus shape convex toward the object side O.

The second lens L2-2 may have negative refractive power. The second lens L2-2 may have, for example, the object-side surface 3* convex toward the object side O. The second lens L2-2 may have, for example, the image-side surface 3* convex toward the object side O. The second lens L2-2 may have, for example, a meniscus shape convex toward the object side O. According to various embodiments, a diameter of the first lens L1-2 may be greater than that of the second lens L2-2. Because the first lens L1-2 and the second lens L2-2 are meniscus lenses having negative refractive power, the fisheye lens assembly may have a reduced total length while ensuring an angle of view of 150° or more.

The third lens L3-2 may have positive refractive power. The third lens L3-2 may have, for example, the object-side surface 5* convex toward the object side O. The third lens L3-2 may have, for example, the image plane-side surface 6* convex toward the object side O. In the third lens L3-2, for example, a radius of curvature of the object-side surface 5* may be less than that of the image plane-side surface 6*.

When the front group G1-2 includes an aspherical lens, the front group G1-2 may ensure the performance even with a small number of lenses. According to various embodiments, the first lens L1-2, the second lens L2-2, and the third lens L3-2 may be aspherical lenses. For example, the first lens L1-2, the second lens L2-2, and the third lens L3-2 may be plastic lenses.

The rear group G2-2 may include a fourth lens L4-2, a fifth lens L5-2, a sixth lens L6-2, and a seventh lens L7-2.

The fourth lens L4-2 may have positive refractive power. The fourth lens L4-2 may have, for example, the object-side surface 8* convex toward the object side O. The fourth lens L4-2 may have, for example, the image plane-side surface 9* concave toward the object side O. The fourth lens L4-2 may have, for example, a biconvex shape.

The fifth lens L5-2 may have negative refractive power. The fifth lens L5-2 may have, for example, the object-side surface 10* concave toward the object side O. The fifth lens L5-2 may have, for example, the image plane-side surface 11* convex toward the object side O. The fifth lens L5-2 may have, for example, a biconcave shape.

The sixth lens L6-2 may have positive refractive power. The sixth lens L6-2 may have, for example, the object-side surface 12* convex toward the object side O. The sixth lens L6-2 may have, for example, the image plane-side surface 13* concave toward the object side O. The sixth lens L6-2 may have, for example, a biconvex shape.

The seventh lens L7-2 may have at least one lens surface having at least one inflection point. The seventh lens L7-2 may have, for example, a meniscus shape in which a central part of a lens surface (within a certain radius from the optical axis OA) is convex toward the object side O. For example, the image plane-side surface 15* of the seventh lens L7-2 may have a concave shape around the optical axis OA based on the image side I and have a shape of being convex from the optical axis OA toward an edge part. For example, the object-side surface 14* of the seventh lens L7-2 may have a convex shape around the optical axis OA based on the object side O and have a shape of being concave from the optical axis OA toward the edge part.

The rear group G2-2 may include three or more lenses. When the rear group G2-2 includes an aspherical lens, the rear group G2-2 may ensure the performance even with a small number of lenses. Because the seventh lens L7-2 located at the most image sensor side is an aspherical lens including an inflection point, the rear group G2-2 may ensure the performance of aberration correction and astigmatism even with a configuration including a small number of lenses. According to various embodiments, the rear group G2-2 may include the fourth lens L4-2, the fifth lens L5-2, the sixth lens L6-2, and the seventh lens L7-2 which are aspherical lenses. For example, the fourth lens L4-2, the fifth lens L5-2, the sixth lens L6-2, and the seventh lens L7-2 may be plastic lenses.

At least one optical device OD may be provided between the seventh lens L7-2 and the image plane IMG. According to various embodiments, the iris ST may be provided between the front group G1-2 and the rear group G2-2.

According to various embodiments, the fourth lens L4-2, the fifth lens L5-2, the sixth lens L6-2, and the seventh lens L7-2 may be aspherical lenses. For example, the fourth lens L4-2, the fifth lens L5-2, the sixth lens L6-2, and the seventh lens L7-2 may be plastic lenses.

Figure 7:
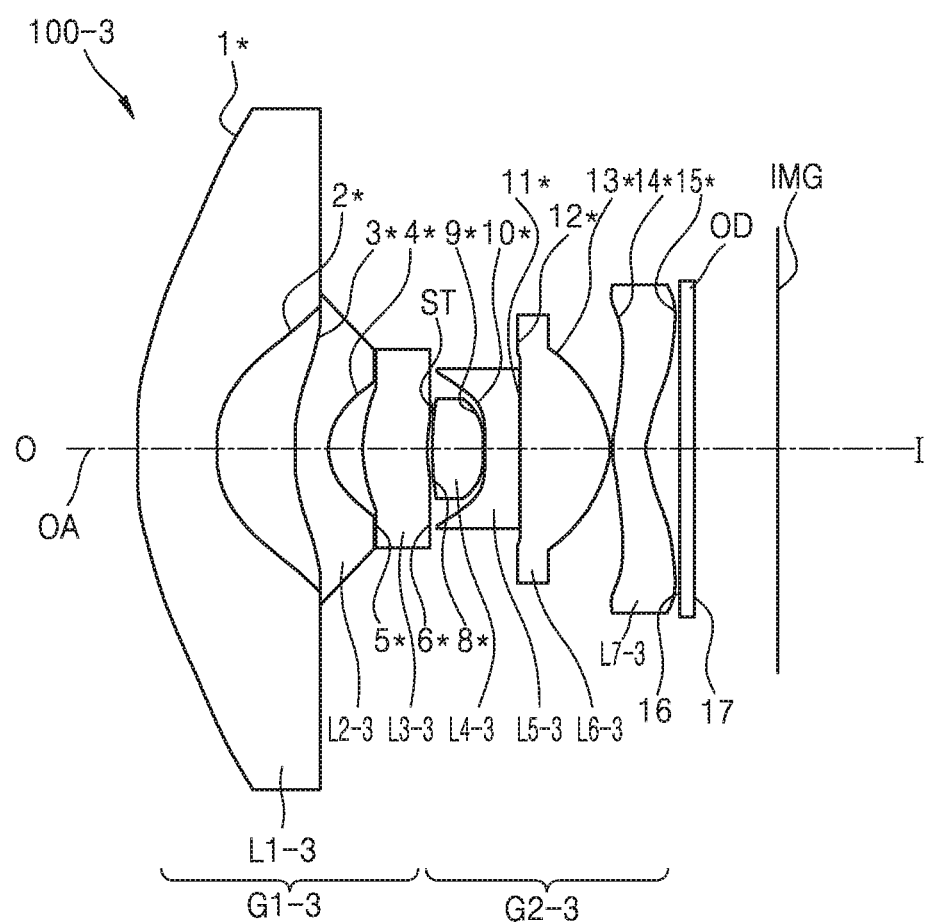
FIG. 7 illustrates a fisheye lens assembly according to an embodiment of a third numerical value among various embodiments.

FIG. 7 illustrates a fisheye lens assembly 100-3 according to a second numeric value embodiment of various embodiments. The fisheye lens assembly 100-3 according to various embodiments may include a front group G1-3 and a rear group G2-3 arranged from the object side O to the image side I.

The front group G1-3 may include a plurality of lenses arranged from the object side O to the image side I. According to various embodiments, the front group G1-3 may include a first lens L1-3, a second lens L2-3, and a third lens L3-3 arranged from the object side O to the image side I.

The first lens L1-3 may have negative refractive power. The first lens L1-3 may have, for example, the object-side surface 1* convex toward the object side O. The first lens L1-3 may have, for example, the image-side surface 2* convex toward the object side O. The first lens L1-3 may have, for example, a meniscus shape convex toward the object side O.

The second lens L2-3 may have negative refractive power. The second lens L2-3 may have, for example, the object-side surface 3* convex toward the object side O. The second lens L2-3 may have, for example, the image-side surface 3* convex toward the object side O. The second lens L2-3 may have, for example, a meniscus shape convex toward the object side O. According to various embodiments, a diameter of the first lens L1-3 may be greater than that of the second lens L2-3. Because the first lens L1-3 and the second lens L2-3 are meniscus lenses having negative refractive power, the fisheye lens assembly may have a reduced total length while ensuring an angle of view of 150° or more.

The third lens L3-3 may have positive refractive power. The third lens L3-3 may have, for example, the object-side surface 5* convex toward the object side O. The third lens L3-3 may have, for example, the image-side surface 6* convex toward the object side O. In the third lens L3-3, for example, a radius of curvature of the object-side surface 5* may be less than that of the image plane-side surface 6*.

When the front group G1-3 includes an aspherical lens, the front group G1-3 may ensure the performance even with a small number of lenses. According to various embodiments, the first lens L1-3, the second lens L2-3, and the third lens L3-3 may be aspherical lenses. For example, the first lens L1-3, the second lens L2-3, and the third lens L3-3 may be plastic lenses.

The rear group G2-3 may include a fourth lens L4-3, a fifth lens L5-3, a sixth lens L6-3, and a seventh lens L7-3.

The fourth lens L4-3 may have positive refractive power. The fourth lens L4-3 may have, for example, the object-side surface 8* convex toward the object side O. The fourth lens L4-3 may have, for example, the image plane-side surface 9* concave toward the object side O. The fourth lens L4-3 may have, for example, a biconvex shape.

The fifth lens L5-3 may have negative refractive power. The fifth lens L5-3 may have, for example, the object-side surface 10* concave toward the object side O. The fifth lens L5-3 may have, for example, the image plane-side surface 11* convex toward the object side O. The fifth lens L5-3 may have, for example, a biconcave shape.

The sixth lens L6-3 may have positive refractive power. The sixth lens L6-3 may have, for example, the object-side surface 12* convex toward the object side O. The sixth lens L6-3 may have, for example, the image plane-side surface 13* concave toward the object side O. The sixth lens L6-3 may have, for example, a biconvex shape.

The seventh lens L7-3 may have at least one lens surface having at least one inflection point. The seventh lens L7-3 may have, for example, a meniscus shape in which a central part of a lens surface (within a certain radius from the optical axis OA) is convex toward the object side O. For example, the image plane-side surface 15* of the seventh lens L7-3 may have a concave shape around the optical axis OA based on the image side I and have a shape of being convex from the optical axis OA toward an edge part. For example, the object-side surface 14* of the seventh lens L7-3 may have a convex shape around the optical axis OA based on the object side O and have a shape of being concave from the optical axis OA toward the edge part.

The rear group G2-3 may include three or more lenses. When the rear group G2-3 includes an aspherical lens, the rear group G2-3 may ensure the performance even with a small number of lenses. Because the seventh lens L7-3 located at the most image sensor side is an aspherical lens including an inflection point, the rear group G2-3 may ensure the performance of aberration correction and astigmatism even with a configuration including a small number of lenses. According to various embodiments, the rear group G2-3 may include the fourth lens L4-3, the fifth lens L5-3, the sixth lens L6-3, and the seventh lens L7-3 which are aspherical lenses. For example, the fourth lens L4-3, the fifth lens L5-3, the sixth lens L6-3, and the seventh lens L7-3 may be plastic lenses.

At least one optical device OD may be provided between the seventh lens L7-3 and the image plane IMG. According to various embodiments, the iris ST may be provided between the front group G1-3 and the rear group G2-3.

According to various embodiments, the fourth lens L4-3, the fifth lens L5-3, the sixth lens L6-3, and the seventh lens L7-3 may be aspherical lenses. For example, the fourth lens L4-3, the fifth lens L5-3, the sixth lens L6-3, and the seventh lens L7-3 may be plastic lenses.

Figure 9:
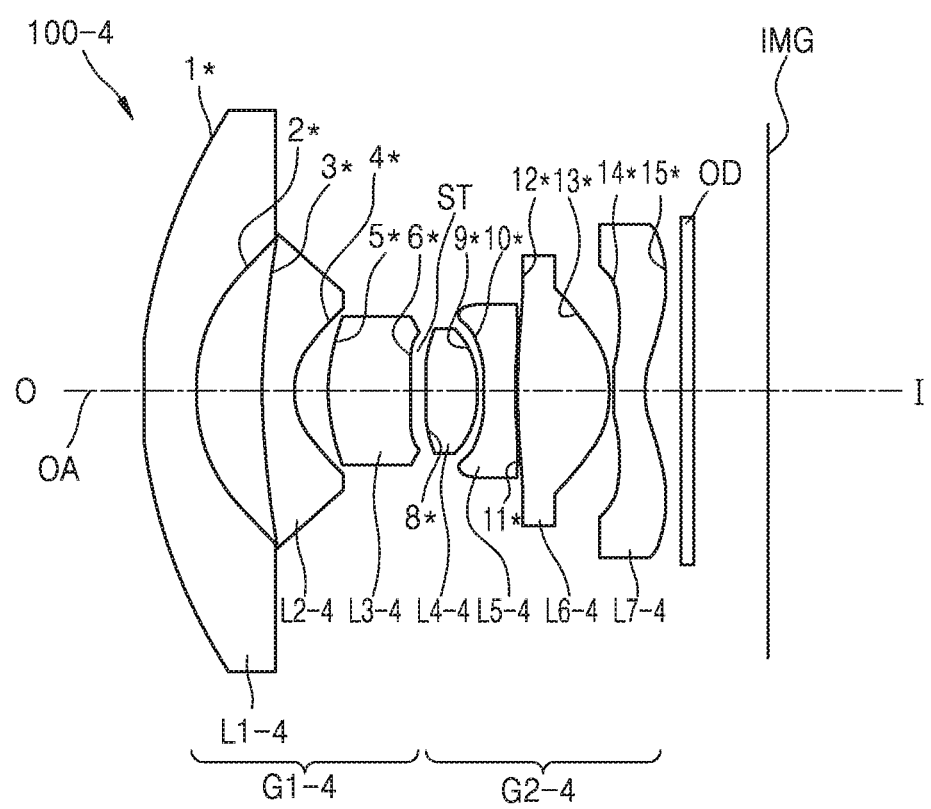
FIG. 9 illustrates a fisheye lens assembly according to an embodiment of a fourth numerical value among various embodiments.

FIG. 9 illustrates a fisheye lens assembly 100-4 according to a second numeric value embodiment of various embodiments. The fisheye lens assembly 100-4 according to various embodiments may include a front group G1-4 and a rear group G2-4 arranged from the object side O to the image side I.

The front group G1-4 may include a plurality of lenses arranged from the object side O to the image side I. According to various embodiments, the front group G1-4 may include a first lens L1-4, a second lens L2-4, and a third lens L3-4 arranged from the object side O to the image side I.

The first lens L1-4 may have negative refractive power. The first lens L1-4 may have, for example, the object-side surface 1* convex toward the object side O. The first lens L1-4 may have, for example, the image-side surface 2* convex toward the object side O. The first lens L1-4 may have, for example, a meniscus shape convex toward the object side O.

The second lens L2-4 may have negative refractive power. The second lens L2-4 may have, for example, the object-side surface 3* convex toward the object side O. The second lens L2-4 may have, for example, the image-side surface 3* convex toward the object side O. The second lens L2-4 may have, for example, a meniscus shape convex toward the object side O. According to various embodiments, a diameter of the first lens L1-4 may be greater than that of the second lens L2-4. Because the first lens L1-4 and the second lens L2-4 are meniscus lenses having negative refractive power, the fisheye lens assembly may have a reduced total length while ensuring an angle of view of 150° or more.

The third lens L3-4 may have positive refractive power. The third lens L3-4 may have, for example, the object-side surface 5* convex toward the object side O. The third lens L3-4 may have, for example, the image-side surface 6* convex toward the object side O. In the third lens L3-4, for example, a radius of curvature of the object-side surface 5* may be less than that of the image plane-side surface 6*.

When the front group G1-4 includes an aspherical lens, the front group G1-4 may ensure the performance even with a small number of lenses. According to various embodiments, the first lens L1-4, the second lens L2-4, and the third lens L3-4 may be aspherical lenses. For example, the first lens L1-4, the second lens L2-4, and the third lens L3-4 may be plastic lenses.

The rear group G2-4 may include a fourth lens L4-4, a fifth lens L5-4, a sixth lens L6-4, and a seventh lens L7-4.

The fourth lens L4-4 may have positive refractive power. The fourth lens L4-4 may have, for example, the object-side surface 8* convex toward the object side O. The fourth lens L4-4 may have, for example, the image plane-side surface 9* concave toward the object side O. The fourth lens L4-4 may have, for example, a biconvex shape.

The fifth lens L5-4 may have negative refractive power. The fifth lens L5-4 may have, for example, the object-side surface 10* concave toward the object side O. The fifth lens L5-4 may have, for example, the image plane-side surface 11* convex toward the object side O. The fifth lens L5-4 may have, for example, a biconcave shape.

The sixth lens L6-4 may have positive refractive power. The sixth lens L6-4 may have, for example, the object-side surface 12* convex toward the object side O. The sixth lens L6-4 may have, for example, the image plane-side surface 13* concave toward the object side O. The sixth lens L6-4 may have, for example, a biconvex shape.

The seventh lens L7-4 may have at least one lens surface having at least one inflection point. The seventh lens L7-4 may have, for example, a meniscus shape in which a central part of a lens surface (within a certain radius from the optical axis OA) is convex toward the object side J. For example, the image plane-side surface 15* of the seventh lens L7-4 may have a concave shape around the optical axis OA based on the image side I and have a shape of being convex from the optical axis OA toward an edge part. For example, the object-side surface 14* of the seventh lens L7-4 may have a convex shape around the optical axis OA based on the object side O and have a shape of being concave from the optical axis OA toward the edge part.

The rear group G2-4 may include three or more lenses. When the rear group G2-4 includes an aspherical lens, the rear group G2-4 may ensure the performance even with a small number of lenses. Because the seventh lens L7-4 located at the most image sensor side is an aspherical lens including an inflection point, the rear group G2-4 may ensure the performance of aberration correction and astigmatism even with a configuration including a small number of lenses. According to various embodiments, the rear group G2-4 may include the fourth lens L4-4, the fifth lens L5-4, the sixth lens L6-4, and the seventh lens L7-4 which are aspherical lenses. For example, the fourth lens L4-4, the fifth lens L5-4, the sixth lens L6-4, and the seventh lens L7-4 may be plastic lenses.

At least one optical device OD may be provided between the seventh lens L7-4 and the image plane IMG. According to various embodiments, the iris ST may be provided between the front group G1-4 and the rear group G2-4.

According to various embodiments, the fourth lens L4-4, the fifth lens L5-4, the sixth lens L6-4, and the seventh lens L7-4 may be aspherical lenses. For example, the fourth lens L4-4, the fifth lens L5-4, the sixth lens L6-4, and the seventh lens L7-4 may be plastic lenses.

Figure 3:
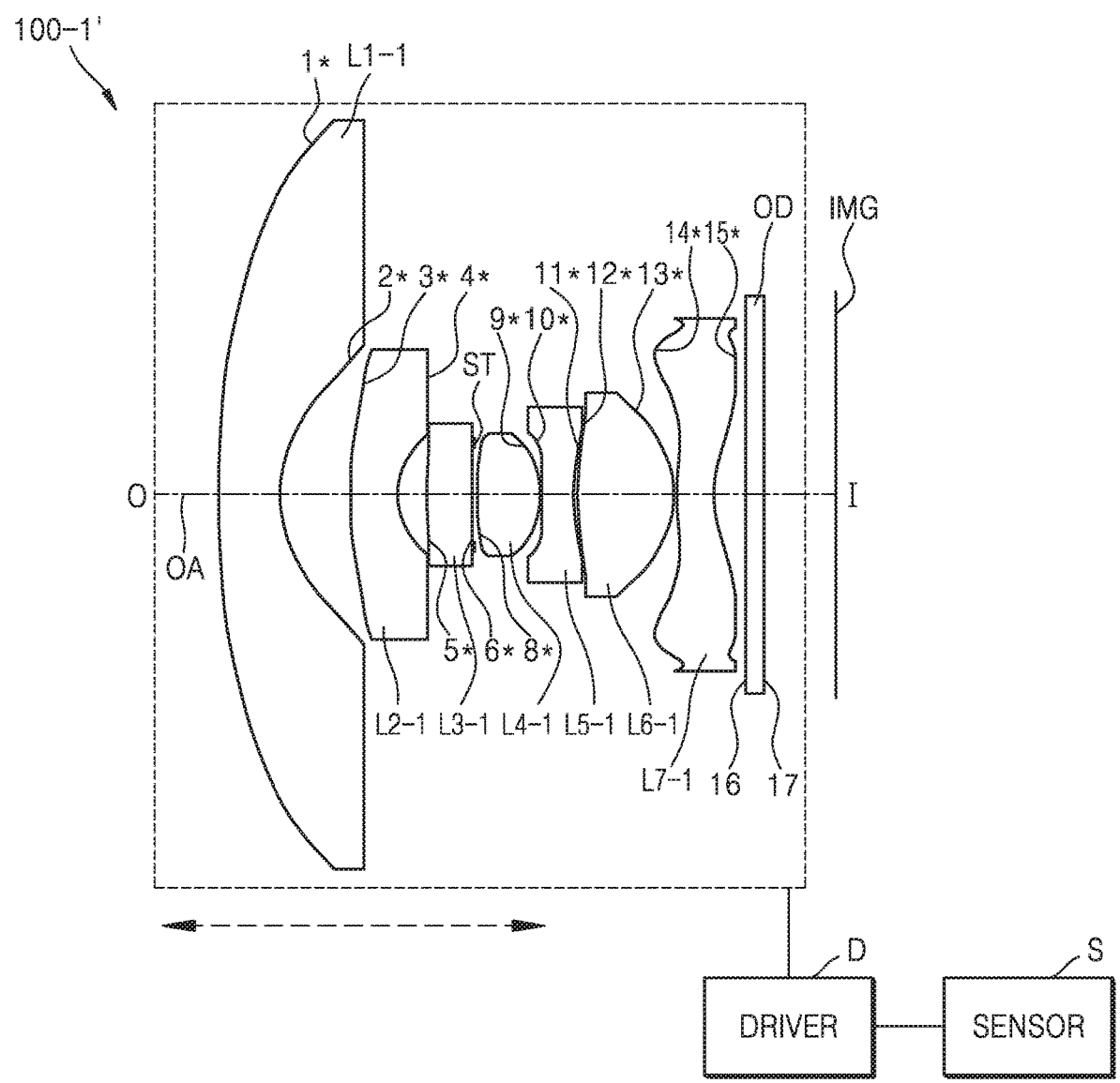
FIG. 3 illustrates a fisheye lens assembly according to another embodiment.

FIG. 3 illustrates a fisheye lens assembly 100-1' according to another embodiment. Referring to FIG. 3, the fisheye lens assembly 100-1' may include a driver D configured to move the front group G1-1, the iris ST, and the rear group G1-1 together to perform focusing and a sensor S configured to sense a change in a temperature. A lens configuration of the fisheye lens assembly 100-1' is substantially the same as that of the fisheye lens assembly 100-1 of FIG. 1, and thus, the description made with reference to FIG. 1 is not repeated herein.

The fisheye lens assembly 100-1' may automatically perform focusing in response to an input of a user. When the fisheye lens assembly 100-1' performs focusing, all lenses therein may move together. For example, the driver D may move the front group G1-1, the iris ST, and the rear group G1-1 together to perform focusing. The sensor S may sense a temperature of the inside or outside of the fisheye lens assembly 100-1'. The driver D may correct focusing according to the temperature measured by the sensor S. For example, the fisheye lens assembly 100-1' may include an aspherical lens of a plastic material, and thus, a surface state, a transmittance refractive power of the fisheye lens assembly 100-1' may be changed according to a temperature change. Mismatch of focusing according to this temperature change may be corrected by operations of the sensor S and the driver D described above. For example, when the fisheye lens assembly 100-1' is exposed to outdoor shooting for a long time, a temperature may be higher or lower than a normal temperature condition, and thus, the sensor S may sense this temperature change, and the driver D may correct a change in the optical performance by moving both the iris ST and the rear group G1-1.

Figure 4:
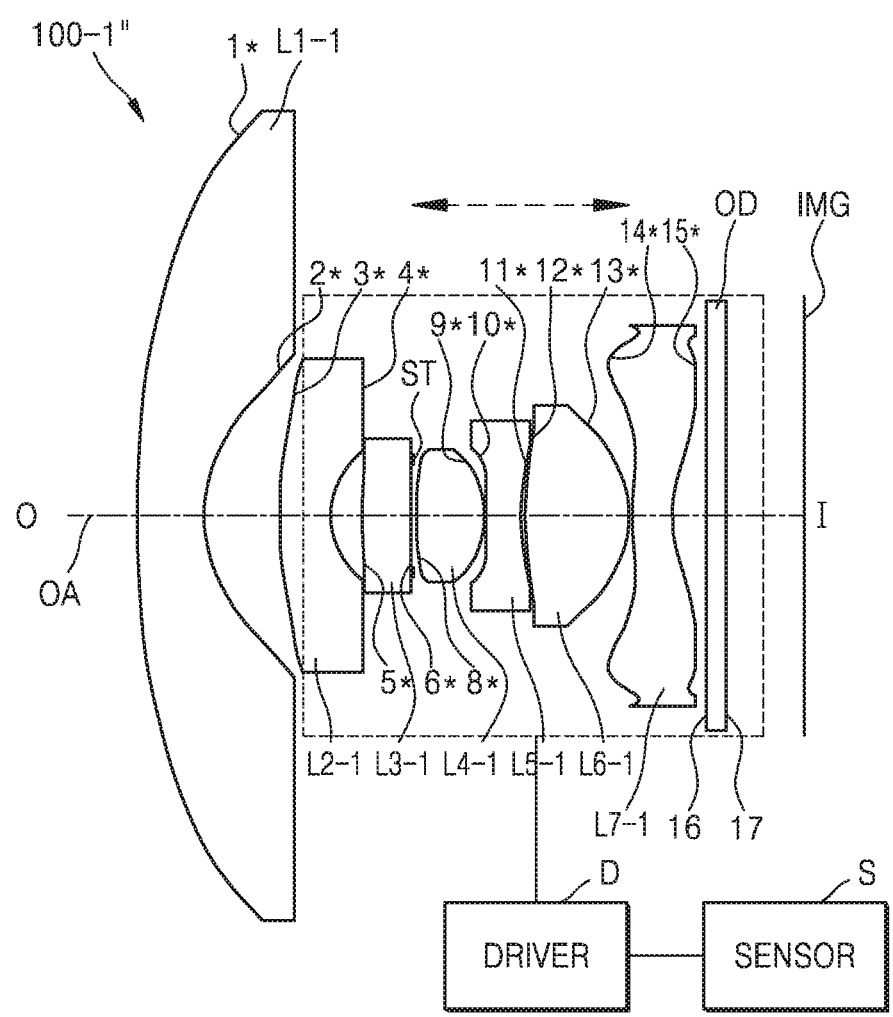
FIG. 4 illustrates a fisheye lens assembly according to another embodiment.

FIG. 4 illustrates a fisheye lens assembly 100-1" according to another embodiment. Referring to FIG. 4, the fisheye lens assembly 100-1" may include the driver D configured to move the second lens L2-1, the third lens L3-1, the iris ST, and the rear group G1-1 together to perform focusing and the sensor S configured to sense a change in a temperature. A lens configuration of the fisheye lens assembly 100-1" is substantially the same as that of the fisheye lens assembly 100-1 of FIG. 1, and thus, the description made with reference to FIG. 1 is not repeated herein.

The fisheye lens assembly 100-1" may automatically perform focusing in response to an input of a user. When the fisheye lens assembly 100-1″ performs focusing, all lenses therein excluding the first lens L1-1 may move together. For example, the driver D may move the second lens L2-1, the third lens L3-1, the iris ST, and the rear group G1-1 together to perform focusing. The sensor S may sense a temperature of the inside or outside of the fisheye lens assembly 100-1″. The driver may correct focusing according to the temperature measured by the sensor S.

In the fisheye lens assembly 100-1″, the first lens L1-1 may be a cover lens protecting a lens system from an external environment or impact. Because the first lens L1-1 is a fixed cover lens, the fisheye lens assembly 100-1″ have a short total length without requiring a separate cover lens.

This configuration of the driver D and the sensor S is applicable to all of the fisheye lens assemblies of FIGS. 5 to 9 and is not limited to the embodiment described above.

A fisheye lens assembly according to various embodiments may conform to a mapping function different from that of a general optical system.

In the general optical system different from a fisheye lens, an image height y and distortion DIY are defined as follows.

$$y = f \cdot \tan \theta$$
$$DIY = \frac{Y_p - y_p}{y_p} \times 100(\%) = \frac{Y_p - f \cdot \tan \theta}{f \cdot \tan \theta} \times 100(\%)$$

Herein, θ denotes an angle of view, f denotes an effective focal length, $Y_p$ denotes an actual image height, and $Y_p$ denotes a paraxial image height.

Unlikely, a mapping function of a fisheye lens may be defined as follows.

| Type | Mapping function of fisheye lens |
|---|---|
| Linear scaled equidistance | y = f · θ |
| Orthographic | y = f · sinθ |
| Equal area (equisolid angle) | y = 2f · sin(θ/2) |
| Stereographic | y = 2f · tan(θ/2) |

Herein, θ denotes an angle of view, and f denotes an effective focal length.

The fisheye lens assembly according to various embodiments may depend on the same mapping function of a fisheye lens as described above. For example, the fisheye lens assembly according to various embodiments may depend on Y=F*θ corresponding to linear scaled equidistance mapping or Y=2F*tan(θ/2) corresponding to stereographic mapping.

The fisheye lens assembly according to various embodiments may include six or more lenses. For example, a front group may consist of three or more lenses, and a rear group may consist of three or more lenses. For example, when the front group consists of three lenses, and the rear group consists of four lenses, the optical performance of an optical system may be easily corrected, and a total length of the optical system may be reduced.

The fisheye lens assembly according to various embodiments may satisfy an expression below. The expressions below will be described with reference to the optical lens assembly 100-1 according to the first numeric value embodiment shown in FIG. 1. However, the expressions may be applied to the other embodiments in the same manner.

150°≤FOV        Conditional expression (1):

Herein, FOV denotes an angle of view of the fisheye lens assembly. The fisheye lens assembly satisfying conditional expression (1) may have a wide angle of view. For example, the fisheye lens assembly according to various embodiments may satisfy 190°≤FOV.

The fisheye lens assembly according to various embodiments may satisfy expressions below.

35 μm≤SAG_MAX        Conditional expression (2):

1.4≤Nd≤1.7        Conditional expression (3):

10≤Abv≤60        Conditional expression (4):

Herein, SAG_MAX denotes a maximum value of absolute values of SAG value of inflection points of the seventh lens L7-1, Nd denotes a refractive index, and Abv denotes an Abbe number.

An SAG value indicates a distance in an optical axis direction from a top of a lens. The SAG value may be defined by an aspherical lens formula, and a detailed description thereof will be made below. An inflection point may indicate a point where a sign of a radius of curvature changes from + to − or from − to +. Alternatively, the inflection point may indicate a point where a lens shape changes from convex to concave or from concave to convex. For an aspherical lens, a change rate of SAG value is not uniform, and when an SAG value is large, it is difficult to process a lens, but aberration may be easily corrected.

When the seventh lens L7-1 satisfies conditional expression (2), aberration may be easily corrected, and a total length of the fisheye lens assembly may be reduced.

When the seventh lens L7-1 satisfies conditional expressions (3) and (4), processing to satisfy conditional expression (2) may be easy. For example, the seventh lens L7-1 satisfying conditional expressions (3) and (4) may be a lens formed of a plastic material.

The fisheye lens assembly according to various embodiments may satisfy an expression below.

1.5≤TL/Y≤6        Conditional expression (5):

Herein, TL denotes a distance from the object-side surface 1* of the first lens L1-1 to the image plane IMG, and Y denotes an image height.

When (TL/Y) exceeds a lower limit of conditional expression (5), a total size of the fisheye lens assembly is small, but relative illumination may decrease, and an inclination of an image height incident angle may be steep. When (TL/Y) exceeds an upper limit of conditional expression (5), the total size of the fisheye lens assembly is large, and thus, it is difficult to satisfy a request for miniaturization.

When the fisheye lens assembly satisfies conditional expression (5), the fisheye lens assembly may prevent relative illumination from decreasing while having a short total length.

The fisheye lens assembly according to various embodiments may satisfy an expression below.

0.5≤TL_f/TL_r≤1.25        Conditional expression (6):

Herein, TL_f denotes a distance from the object-side surface 1* of the first lens L1-1 of the front group G1-1 to the image plane-side surface 6* of the third lens L3-1, and TL_r denotes a distance from the object-side surface 8* of the fourth lens of the rear group G2-1 to the image plane-side surface 14* of the seventh lens.

Conditional expression (6) is a conditional expression of a total length ratio of the front group G1-1 to the rear group G2-1. When various fisheye lens assemblies satisfy conditional expression (6), a total length of the front group G1-1 may be not excessively long, and a gap between lenses may be maintained within a certain range, such that a total length of the fisheye lens assembly may be reduced. When (TL_f/TL_r) exceeds a lower limit of conditional expression (6), the total length of the front group G1-1 may be excessively limited, and thus, it is difficult to obtain a sufficient angle of view. On the contrary, when (TL_f/TL_r) exceeds an upper limit of conditional expression (6), a total length rate of the rear group G2-1 may be reduced, and thus, it is difficult to ensure the image height Y, and it is difficult to correct astigmatism and coma. For example, the fisheye lens assembly according to various embodiments may satisfy 0.7≤TL_f/TL_r≤1.25.

The fisheye lens assembly according to various embodiments may satisfy an expression below.

1.25≤CT_A/CT_B≤4.     Conditional expression (7):

Herein, CT_A denotes a central thickness of the sixth lens L6-1, and the CT_B denotes a central thickness of the seventh lens L7-1.

Conditional expression (7) is a conditional expression related to the seventh lens L7-1 and the sixth lens L6-1 located closest to the image plane IMG in the rear group G2-1. When various fisheye lens assemblies satisfy conditional expression (7), an image height may be easily ensured, aberration may be easily corrected, and a lens may be easily processed. The greater a thickness of the sixth lens L6-1 is, and the less a radius of curvature of the sixth lens L6-1 is, the more easily an image height may be ensured, and the more easily aberration may be corrected, but the more difficult manufacturing of a lens is. The less a thickness of the seventh lens L7-1 around the optical axis OA is, the more easily aberration may be corrected, but the more difficult manufacturing of a lens is because an SAG value is greater.

When (CT_A/CT_B) exceeds an upper limit, the sixth lens L6-1 is thick, and thus, a total length of the rear group G2-1 may be great. On the contrary, when (CT_A/CT_B) exceeds a lower limit, the sixth lens L6-1 is thin, and thus, it may be difficult to ensure an image height and to correct aberration. For example, the fisheye lens assembly according to various embodiments may satisfy 2.5≤CT_A/CT_B≤3.

The definition of an aspherical surface used for the fisheye lens assembly according to various embodiments is as follows.

An aspherical shape may be expressed by the following expression by setting a traveling direction of a light beam to be positive when an optical axis direction is assumed as an x-axis and a direction orthogonal to the optical axis direction is assumed as a y-axis. Herein, x denotes an SAG value that is a distance in the optical axis direction from a top of a lens, y denotes a distance in the direction orthogonal to an optical axis, K denotes a conic constant, A, B, C, D, . . . denote aspherical coefficients, and c denotes a reciprocal number (1/R) of a radius of curvature at the top of the lens.

$$x = \frac{cy^2}{1 + \sqrt{1-(K+1)c^2y^2}} + Ay^4 + By^6 + Cy^8 + Dy^{10} + \ldots$$

In the inventive concept, a fisheye lens assembly may be implemented through numeric value embodiments according to various designs as follows.

Lens surface numbers 1, 2, 3, . . . , n (n is a natural number) in each numeric value embodiment are sequentially granted in series from the object side O to the image side I. R denotes a radius of curvature, Dn denotes a thickness of a lens or an air gap between lenses, Nd denotes a refractive index, and Vd denotes an Abbe number. ST denotes an iris, and * denotes an aspherical surface.

First Numeric Value Embodiment

FIG. 1 illustrates the fisheye lens assembly according to the first numeric value embodiment of various embodiments, and Table 1 illustrates, for example, design data of the first numeric value embodiment.

TABLE 1

| Lens surface | R (mm) | Dn (mm) | Nd | Vd |
|---|---|---|---|---|
| OBJ | infinity | infinity | | |
| 1* | 16.128 | 0.385 | 1.5311 | 55.91 |
| 2* | 0.861 | 0.435 | | |
| 3* | 2 | 0.302 | 1.5311 | 55.91 |
| 4* | 0.5 | 0.179 | | |
| 5* | 1.784 | 0.29 | 1.63912 | 23.5 |
| 6* | -3.416 | 0.018 | | |
| ST | Infinity | 0.015 | | |
| 8* | 11.129 | 0.393 | 1.5441 | 56.09 |
| 9* | -0.667 | 0.01 | | |
| 10* | 2.495 | 0.2 | 1.65038 | 21.52 |
| 11* | 0.804 | 0.026 | | |
| 12* | 1.256 | 0.605 | 1.5348 | 55.71 |
| 13* | -0.589 | 0.01 | | |
| 14* | 2.401 | 0.234 | 1.61442 | 25.95 |
| 15* | 0.674 | 0.202 | | |
| 16 | infinity | 0.11 | 1.5168 | 64.2 |
| 17 | infinity | 0.43 | | |
| IMG | infinity | 0.03 | | |

Table 2 illustrates aspherical coefficients in the first numeric value embodiment.

TABLE 2

| | K | A | B | C | D | E | F | G | H | J |
|---|---|---|---|---|---|---|---|---|---|---|
| 1* | 3.25.E+01 | 8.87.E-02 | -6.387.E-02 | 2.76.E-02 | -7.04.E-03 | 9.29.E-04 | -8.868.E-06 | -1.55.E-05 | 2.05.E-06 | -8.82.E-08 |
| 2* | -1.90.E+00 | 3.09.E-01 | 4.918.E-02 | -5.30.E-01 | 3.59.E-01 | -2.70.E-01 | 2.521.E-02 | 1.74.E-01 | 0.00.E+00 | 0.00.E+00 |
| 3* | -2.02.E+00 | -1.70.E-02 | -9.259.E-01 | 3.03.E+00 | -6.58.E+00 | 8.94.E+00 | -5.856.E+00 | 3.38.E+00 | -5.60.E+00 | 3.78.E+00 |
| 4* | -2.83.E-01 | 2.01.E+00 | -4.614.E-01 | -1.55.E+02 | 1.26.E+03 | 2.76.E+04 | -4.317.E+05 | 1.68.E+06 | -3.45.E+05 | -5.09.E+06 |
| 5* | 1.97.E+03 | -5.17.E-01 | -1.160.E+01 | -1.82.E+02 | 9.86.E+03 | -1.95.E+05 | 1.796.E+06 | -8.49.E+06 | 2.06.E+07 | -2.38.E+07 |
| 6* | -2.69.E+01 | 3.04.E+00 | -4.115.E+01 | 3.92.E+02 | -5.82.E+03 | 5.09.E+04 | 3.582.E+05 | -2.18.E+06 | -8.73.E+07 | 7.08.E+08 |
| 8* | -9.87.E+01 | 4.77.E+00 | -5.048.E+01 | 3.16.E+02 | -1.29.E+03 | 6.11.E+02 | 1.315.E+04 | 1.44.E+05 | -3.89.E+04 | 0.00.E+00 |
| 9* | -6.71.E+00 | -4.03.E+00 | -1.288.E+02 | 5.19.E+03 | -9.79.E+04 | 1.04.E+06 | -6.376.E+06 | 2.07.E+07 | -2.74.E+07 | 0.00.E+00 |
| 10* | -8.70.E+00 | -4.69.E+00 | -4.962.E+00 | 6.54.E+02 | -1.30.E+04 | 1.20.E+05 | -5.131.E+05 | 1.69.E+06 | -2.00.E+06 | 0.00.E+00 |
| 11* | -8.86.E+00 | -2.09.E+00 | 2.167.E+01 | -1.79.E+02 | 8.49.E+02 | -1.90.E+03 | 3.575.E+02 | 5.85.E+03 | -7.43.E+03 | 0.00.E+00 |
| 12* | -6.87.E+00 | -3.25.E+00 | 4.049.E+01 | -3.22.E+02 | 1.63.E+03 | -5.05.E+03 | 8.970.E+03 | -8.13.E+03 | 2.64.E+03 | 0.00.E+00 |
| 13* | -2.03.E+00 | 4.59.E-01 | -1.117.E+01 | 8.13.E+01 | -4.00.E+02 | 1.19.E+03 | -2.009.E+03 | 1.74.E+03 | -5.83.E+02 | 0.00.E+00 |

TABLE 2-continued

| | K | A | B | C | D | E | F | G | H | J |
|---|---|---|---|---|---|---|---|---|---|---|
| 15* | −9.85.E+01 | −3.08.E−01 | −9.330.E−01 | −5.21.E+00 | 3.54.E+01 | −7.68.E+01 | 8.107.E+01 | −4.12.E+01 | 7.92.E+00 | 0.00.E+00 |
| 16* | −7.34.E+00 | −1.86.E−01 | 4.676.E−01 | −7.10.E+00 | 3.06.E+01 | −6.55.E+01 | 7.724.E+01 | −4.83.E+01 | 1.25.E+01 | 0.00.E+00 |

Table 3 illustrates an SAG value in the first numeric value embodiment.

TABLE 3

| Y | SAG (mm) |
|---|---|
| 0 | 0.000 |
| 0.02 | 0.000 |
| 0.04 | 0.000 |
| 0.06 | 0.001 |
| 0.08 | 0.001 |
| 0.1 | 0.002 |
| 0.12 | 0.003 |
| 0.14 | 0.004 |
| 0.16 | 0.005 |
| 0.18 | 0.006 |
| 0.2 | 0.007 |
| 0.22 | 0.008 |
| 0.24 | 0.009 |
| 0.26 | 0.010 |
| 0.28 | 0.010 |
| 0.3 | 0.011 |
| 0.32 | 0.012 |
| 0.34 | 0.012 |
| 0.36 | 0.012 |
| 0.38 | 0.011 |
| 0.4 | 0.010 |
| 0.42 | 0.009 |
| 0.44 | 0.007 |
| 0.46 | 0.004 |
| 0.48 | 0.001 |
| 0.5 | −0.002 |
| 0.52 | −0.007 |
| 0.54 | −0.012 |
| 0.56 | −0.018 |
| 0.58 | −0.024 |
| 0.6 | −0.031 |
| 0.62 | −0.038 |
| 0.64 | −0.046 |
| 0.66 | −0.055 |
| 0.68 | −0.063 |
| 0.7 | −0.072 |
| 0.72 | −0.082 |
| 0.74 | −0.091 |

Figure 2:
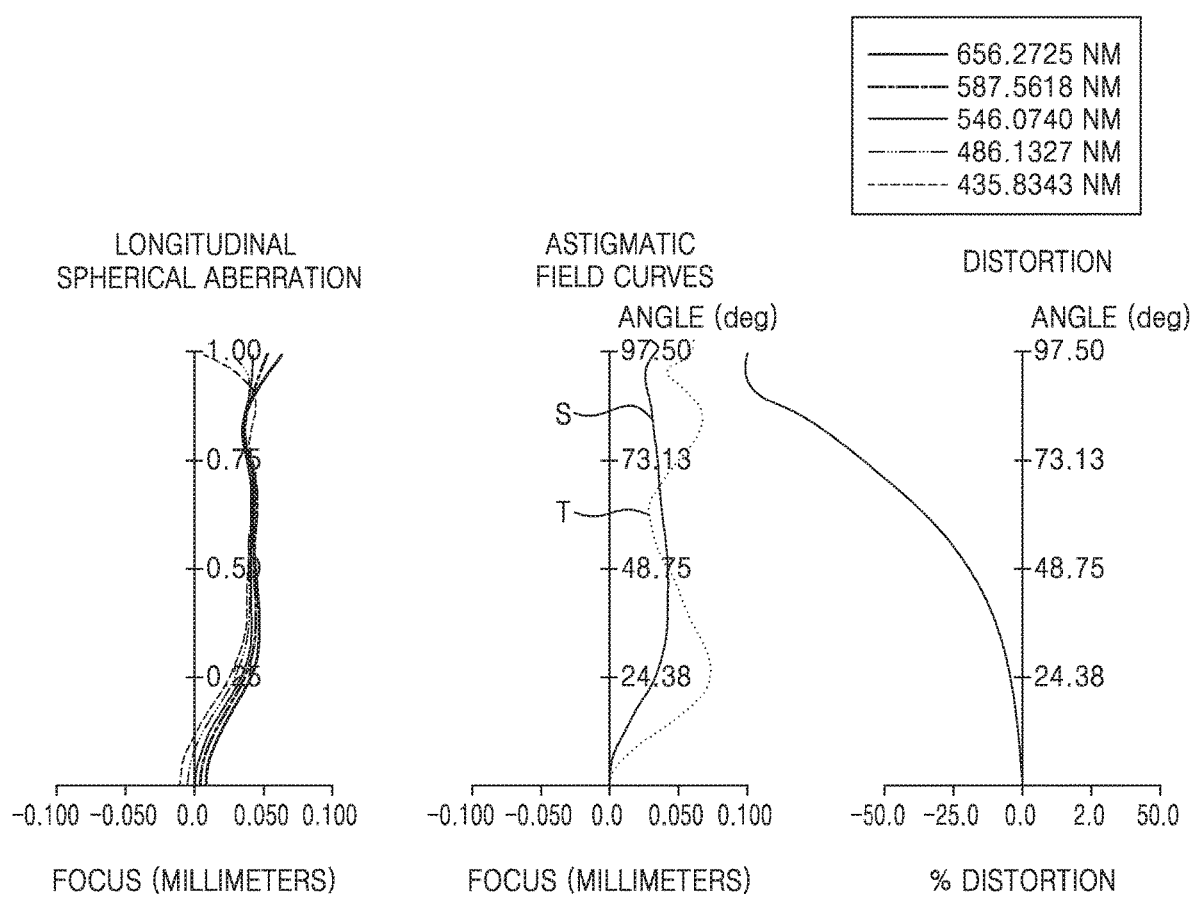
FIG. 2 illustrates an aberration diagram of the fisheye lens assembly according to the embodiment of a first numerical value among various embodiments.

FIG. 2 illustrates longitudinal spherical aberration, astigmatic field curves, and distortion of the fisheye lens assembly according to the first numeric value embodiment of the inventive concept. The longitudinal spherical aberration is Illustrated for light of which wavelengths are 656.2725 nanometers (NM), 587.5618 NM, 546.0740 NM, 486.1327 NM, 435.8343 NM, and the astigmatic field curves are illustrated for a tangential field curvature T and a sagittal field curvature S. The astigmatic field curves are illustrated for light of which a wavelength is 546.0740 NM, and the distortion is illustrated for the light of which the wavelength is 546.0740 NM.

Second Numeric Value Embodiment

FIG. 5 illustrates the fisheye lens assembly according to the second numeric value embodiment of various embodiments, and Table 4 illustrates design data of the second numeric value embodiment.

TABLE 4

| Lens surface | R (mm) | Dn (mm) | Nd | Vd |
|---|---|---|---|---|
| OBJ | infinity | infinity | | |
| 1* | 4.317 | 0.212 | 1.5312 | 56.5 |
| 2* | 1.658 | 0.603 | | |
| 3* | 3.299 | 0.303 | 1.5441 | 56.1 |
| 4* | 0.597 | 1.675 | | |
| 5* | 1.899 | 0.527 | 1.6504 | 21.5 |
| 6* | 4.797 | 0.208 | | |
| ST | Infinity | 0.000 | | |
| 8* | 2.241 | 0.446 | 1.5441 | 56.1 |
| 9* | −1.104 | −0.006 | | |
| 10* | −6.194 | −0.161 | 1.6504 | 21.5 |
| 11* | 3.533 | 0.283 | | |
| 12* | 8.069 | 0.124 | 1.5441 | 56.1 |
| 13* | −0.790 | −1.266 | | |
| 14* | 1.618 | 0.618 | 1.6504 | 21.5 |
| 15* | 0.818 | 0.3 | | |
| 16 | infinity | 0.110 | 1.517 | 64.2 |
| 17 | infinity | 0.832 | | |
| IMG | infinity | 0.004 | | |

Table 5 illustrates aspherical coefficients in the second numeric value embodiment.

TABLE 5

| | K | A | B | C | D | E | F | G | H | J |
|---|---|---|---|---|---|---|---|---|---|---|
| 1* | 7.92.E−0.2 | 1.13.E−01 | −7.54.E−02 | 2.47.E−02 | −4.95.E−03 | 6.47.E−04 | −5.51.E−05 | 2.94.E−06 | −8.86.E−08 | 1.15.E−09 |
| 2* | −3.21.E−02 | 2.04.E−01 | −1.48.E−01 | 2.24.E−02 | −2.95.E−04 | 9.81.E−04 | −3.11.E−04 | 0.00.E+00 | 0.00.E+00 | 0.00.E+00 |
| 3* | −3.13.E+01 | 4.23.E−02 | −1.10.E−01 | 1.98.E−01 | −1.94.E−01 | 1.09.E−01 | −3.74.E−02 | 9.80.E−03 | −2.62.E−03 | 4.28.E−04 |
| 4* | −4.16.E−01 | −1.55.E−01 | −8.18.E−01 | 2.01.E+00 | −9.91.E+00 | 2.69.E+01 | −4.21.E+01 | 3.53.E+01 | −2.00.E+01 | −3.68.E+01 |
| 5* | −3.98.E+00 | −1.17.E−01 | −1.06.E−02 | −8.44.E+00 | 7.08.E+01 | −3.56.E+02 | 1.17.E+03 | −2.43.E+03 | 2.89.E+03 | −1.48.E+03 |
| 6* | 8.19E+01 | 2.52.E−02 | −3.01.E−01 | 1.14.E+00. | 7.15E+00 | 3.21E−02 | 4.49.E−02 | −2.55.E−07 | 3.82.E−08 | −1.67.E−05 |
| 8* | −2.81.E−02 | 1.91.E−01 | 4.20.E−02 | 5.33.E−01 | −2.59.E−04 | 1.09.E−03 | −3.08.E−04 | 0.00.E+00 | 0.00.E+00 | 0.00.E+00 |
| 9* | −1.71.E−01 | −2.11.E+00 | 9.50.E+01 | −4.66.E+01 | 2.28.E+02 | −1.05.E+03 | 3.37.E+03 | −5.77.E+03 | 3.86.E+03 | 0.00.E+00 |
| 10* | 6.19.E−01 | −1.50.E+00 | 2.47.E+00 | 4.93.E−01 | −3.15.E+01 | 5.20.E+01 | 6.55.E+00 | 0.00.E+00 | 0.00.E+00 | 0.00.E+00 |
| 11* | 1.46.E.+01 | −6.86.E−01 | −2.19.E−01 | 2.51.E+00 | 1.71.E+01 | −1.09.E+02 | 2.37.E+02 | −2.36.E+02 | 9.12.E+01 | 0.00.E+00 |
| 12* | 6.17.E+01 | 4.08.E−01 | −3.84.E+00 | 1.63.E+01 | −3.65.E+01 | 3.78.E+01 | 2.54.E+00 | −4.77.E+01 | 4.46.E+01 | −1.38.E+01 |
| 13* | −7.62.E−01 | 5.07.E−01 | −3.92.E−01 | −1.82.E+00 | 5.83.E+00 | −9.08.E+00 | 8.71.E+00 | −4.54.E+00 | 9.21.E−01 | 0.00.E+00 |
| 15* | −3.00.E+01 | 1.38.E−01 | −6.68.E−01 | −2.44.E−01 | 1.19.E+00 | −9.35.E−01 | 3.41.E−01 | −6.08.E−02 | 4.28.E−03 | 0.00.E+00 |
| 16* | −8.22.E+00 | 2.09.E−01 | −8.62.E−01 | 1.05.E+00 | −6.48.E−01 | 1.50.E−01 | 4.51.E−02 | −3.42.E−02 | 5.85.E−03 | 0.00.E+00 |

Table 6 illustrates an SAG value in the second numeric value embodiment.

TABLE 6

| Y | SAG (mm) |
|---|---|
| 0 | 0.000 |
| 0.02 | 0.000 |
| 0.04 | 0.000 |
| 0.06 | 0.001 |
| 0.08 | 0.002 |
| 0.1 | 0.003 |
| 0.12 | 0.004 |
| 0.14 | 0.005 |
| 0.16 | 0.007 |
| 0.18 | 0.008 |
| 0.2 | 0.010 |
| 0.22 | 0.012 |
| 0.24 | 0.014 |
| 0.26 | 0.016 |
| 0.28 | 0.018 |
| 0.3 | 0.021 |
| 0.32 | 0.023 |
| 0.34 | 0.026 |
| 0.36 | 0.029 |
| 0.38 | 0.032 |
| 0.4 | 0.035 |
| 0.42 | 0.038 |
| 0.44 | 0.041 |
| 0.46 | 0.044 |
| 0.48 | 0.047 |
| 0.5 | 0.051 |
| 0.52 | 0.054 |
| 0.54 | 0.057 |
| 0.56 | 0.061 |
| 0.58 | 0.064 |
| 0.6 | 0.067 |
| 0.62 | 0.071 |
| 0.64 | 0.074 |
| 0.66 | 0.077 |
| 0.68 | 0.080 |
| 0.7 | 0.082 |
| 0.72 | 0.085 |
| 0.74 | 0.087 |
| 0.76 | 0.089 |
| 0.78 | 0.090 |
| 0.8 | 0.091 |
| 0.82 | 0.092 |
| 0.84 | 0.092 |
| 0.86 | 0.092 |
| 0.88 | 0.091 |
| 0.9 | 0.090 |
| 0.92 | 0.088 |
| 0.94 | 0.086 |
| 0.96 | 0.083 |

TABLE 6-continued

| Y | SAG (mm) |
|---|---|
| 0.98 | 0.080 |
| 1 | 0.076 |
| 1.02 | 0.071 |
| 1.04 | 0.066 |
| 1.06 | 0.060 |
| 1.08 | 0.054 |
| 1.1 | 0.048 |
| 1.12 | 0.041 |
| 1.14 | 0.034 |
| 1.16 | 0.027 |

Figure 6:
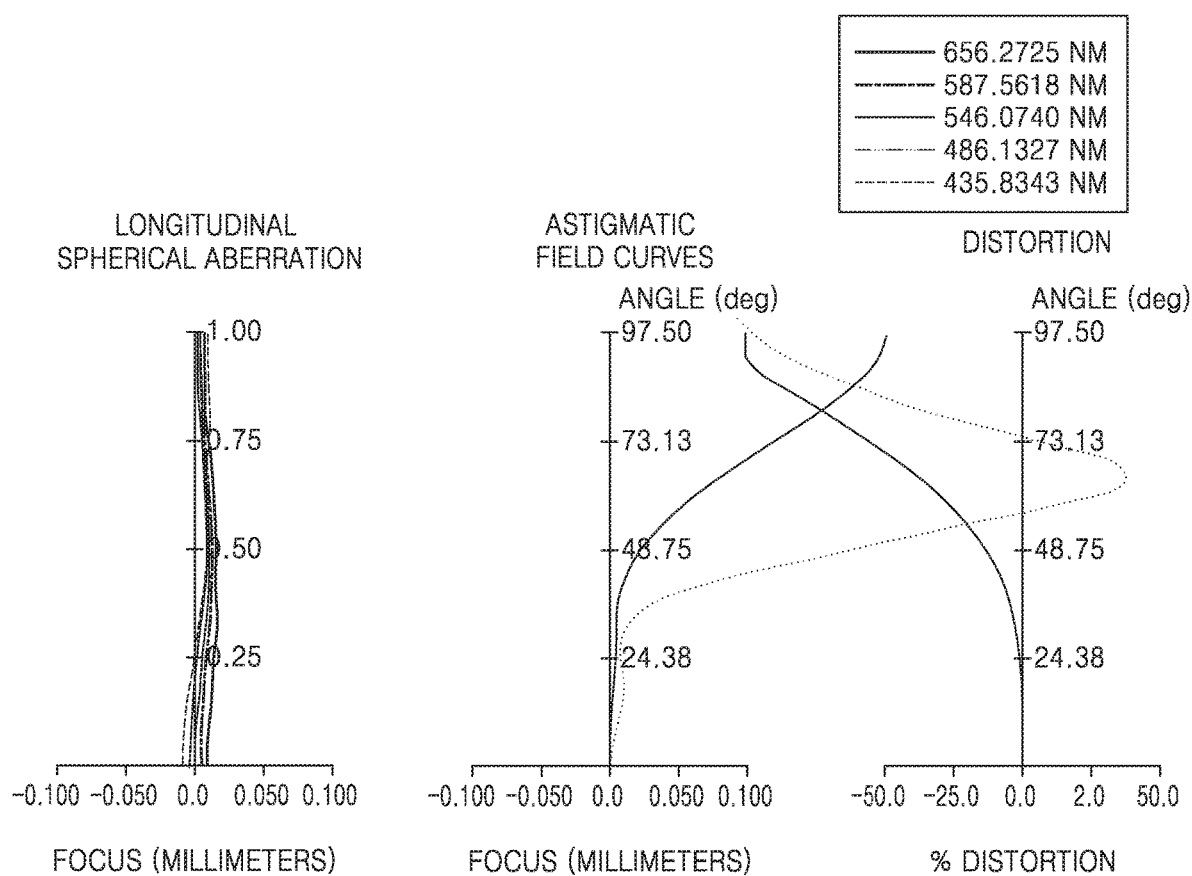
FIG. 6 illustrates an aberration diagram of the fisheye lens assembly according to the embodiment of the second numerical value among various embodiments.

FIG. 6 illustrates longitudinal spherical aberration, astigmatic field curves, and distortion of the fisheye lens assembly according to the second numeric value embodiment of various embodiments.

Third Numeric Value Embodiment

FIG. 7 illustrates the fisheye lens assembly according to the third numeric value embodiment of various embodiments, and Table 7 illustrates design data of the third numeric value embodiment.

TABLE 7

| Lens surface | R (mm) | Dn (mm) | Nd | Vd |
|---|---|---|---|---|
| OBJ | infinity | infinity | | |
| 1* | 8.571 | 0.662 | 1.5312 | 55.9 |
| 2* | 1.140 | 0.675 | | |
| 3* | 1.821 | 0.297 | 1.5441 | 56.1 |
| 4* | 0.539 | 0.296 | | |
| 5* | 1.276 | 0.555 | 1.6504 | 21.5 |
| 6* | 8.093 | 0.024 | | |
| ST | Infinity | 0.010 | | |
| 8* | 4.444 | 0.446 | 1.5441 | 56.1 |
| 9* | −1.232 | 0.010 | | |
| 10* | −7.981 | 0.275 | 1.6504 | 21.5 |
| 11* | 4.588 | 0.010 | | |
| 12* | 6.086 | 0.789 | 1.5441 | 56.1 |
| 13* | −0.624 | 0.010 | | |
| 14* | 1.842 | 0.283 | 1.6504 | 21.5 |
| 15* | 0.751 | 0.300 | | |
| 16 | 1.00E+18 | 0.110 | 1.517 | 64.2 |
| 17 | 1.00E+18 | 0.703 | | |
| IMG | 1.00E+18 | 0.006 | | |

Table 8 illustrates aspherical coefficients in the third numeric value embodiment.

TABLE 8

| | K | A | B | C | D | E | F | G | H | J |
|---|---|---|---|---|---|---|---|---|---|---|
| 1* | −6.43.E+00 | 1.07.E−01 | −5.41.E−02 | 1.41.E−02 | −2.20.E−03 | 2.14.E−04 | −1.29.E−05 | 4.62.E−07 | −8.86.E−09 | 6.91.E−11 |
| 2* | −5.80.E−01 | 3.05.E−01 | −8.82.E−02 | −5.90.E−02 | −7.73.E−03 | −6.25.E−03 | 2.59.E−03 | 4.01.E−03 | 0.00.E+00 | 0.00.E+00 |
| 3* | −1.86.E+00 | −6.40.E−04 | −1.39.E−01 | 1.86.E−01 | −1.94.E−01 | 1.14.E−01 | −3.26.E−02 | 1.20.E−02 | −2.74.E−03 | −1.36.E−03 |
| 4* | −2.81.E−01 | 1.24.E−01 | −1.13.E−00 | 2.08.E+00 | −1.10.E+01 | 2.74.E+01 | −2.38.E+01 | 8.32.E+01 | −1.72.E+02 | −2.00.E+03 |
| 5* | −4.33.E+00 | 1.80.E−01 | 1.52.E+00 | −3.04.E+01 | 2.44.E+02 | −1.15.E+03 | 3.28.E+0.3 | −5.84.E+03 | 6.00.E+03 | −2.67.E+03 |
| 6* | −9.55.E+01 | 3.87.E−01 | 8.66.E−01 | −2.48.E+01 | 2.09.E+02 | 6.29.E+02 | −1.09.E+03 | −5.16.E+04 | −2.37.E+05 | 3.58.E+06 |
| 8* | −1.40.E+00 | 5.48.E−01 | −1.12.E+00 | 1.16.E+00 | 4.85.E−02 | −2.93.E−03 | 1.10.E−04 | 0.00.E+00 | 0.00.E+00 | 0.00.E+00 |
| 9* | −2.81.E−01 | −4.23.E+00 | 5.02.E+01 | −7.61.E+02 | 7.34.E+03 | −4.22.E+04 | 1.37.E+05 | −2.29.E+05 | 1.54.E+05 | 0.00.E+00 |
| 10* | 9.60.E+01 | −3.29.E+00 | 3.36.E+01 | −5.43.E+02 | 5.12.E+03 | −2.81.E+04 | 8.45.E+04 | −1.27.E+05 | 7.53.E+04 | 0.00.E+00 |
| 11* | −4.81.E+01 | 1.44.E+00 | −1.48.E+01 | 5.74.E+01 | −1.17.E+02 | 1.10.E+02 | 1.00.E+01 | 1.10.E+02 | 1.01.E+02 | −5.19.E+01 |
| 12* | −5.76.E+02 | 1.43.E+00 | −1.31.E+01 | 4.83.E+01 | −9.90.E+01 | 1.20.E+02 | −7.73.E+01 | 1.89.E+01 | 0.00.E+00 | 0.00.E+00 |
| 13* | −1.04.E+00 | 8.06.E−01 | −3.17.E+00 | 1.15.E+01 | −3.56.E+01 | 7.48.E+01 | −9.80.E+01 | 7.13.E+01 | −2.15.E+01 | 0.00.E+00 |
| 15* | −4.57.E+01 | 1.46.E−01 | −9.00.E−02 | −5.06.E−01 | 7.76.E−01 | −5.26.E−01 | 1.96.E−01 | −3.82.E−02 | 3.01.E−03 | 0.00.E+00 |
| 16* | −8.32.E+00 | −2.87.E−02 | 2.95.E−01 | −9.74.E−01 | 1.33.E+00 | −1.01.E+00 | 4.48.E−01 | −1.08.E−01 | 1.11.E−02 | 0.00.E+00 |

Table 9 illustrates an SAG value in the third numeric value embodiment.

TABLE 9

| Y | SAG (mm) |
|---|---|
| 0 | 0.000 |
| 0.02 | 0.000 |
| 0.04 | 0.000 |
| 0.06 | 0.001 |
| 0.08 | 0.002 |
| 0.1 | 0.003 |
| 0.12 | 0.004 |
| 0.14 | 0.005 |
| 0.16 | 0.007 |
| 0.18 | 0.008 |
| 0.2 | 0.010 |
| 0.22 | 0.012 |
| 0.24 | 0.014 |
| 0.26 | 0.016 |
| 0.28 | 0.018 |
| 0.3 | 0.021 |
| 0.32 | 0.023 |
| 0.34 | 0.026 |
| 0.36 | 0.029 |
| 0.38 | 0.032 |
| 0.4 | 0.035 |
| 0.42 | 0.038 |
| 0.44 | 0.041 |
| 0.46 | 0.044 |
| 0.48 | 0.047 |
| 0.5 | 0.051 |
| 0.52 | 0.054 |
| 0.54 | 0.057 |
| 0.56 | 0.061 |
| 0.58 | 0.064 |
| 0.6 | 0.067 |
| 0.62 | 0.071 |
| 0.64 | 0.074 |
| 0.66 | 0.077 |
| 0.68 | 0.080 |
| 0.7 | 0.082 |
| 0.72 | 0.085 |
| 0.74 | 0.087 |
| 0.76 | 0.089 |
| 0.78 | 0.090 |
| 0.8 | 0.091 |
| 0.82 | 0.092 |
| 0.84 | 0.092 |
| 0.86 | 0.092 |
| 0.88 | 0.091 |
| 0.9 | 0.090 |
| 0.92 | 0.088 |
| 0.94 | 0.086 |
| 0.96 | 0.083 |
| 0.98 | 0.080 |
| 1 | 0.076 |
| 1.02 | 0.071 |
| 1.04 | 0.066 |
| 1.06 | 0.060 |
| 1.08 | 0.054 |
| 1.1 | 0.048 |
| 1.12 | 0.041 |
| 1.14 | 0.034 |
| 1.16 | 0.027 |

Figure 8:
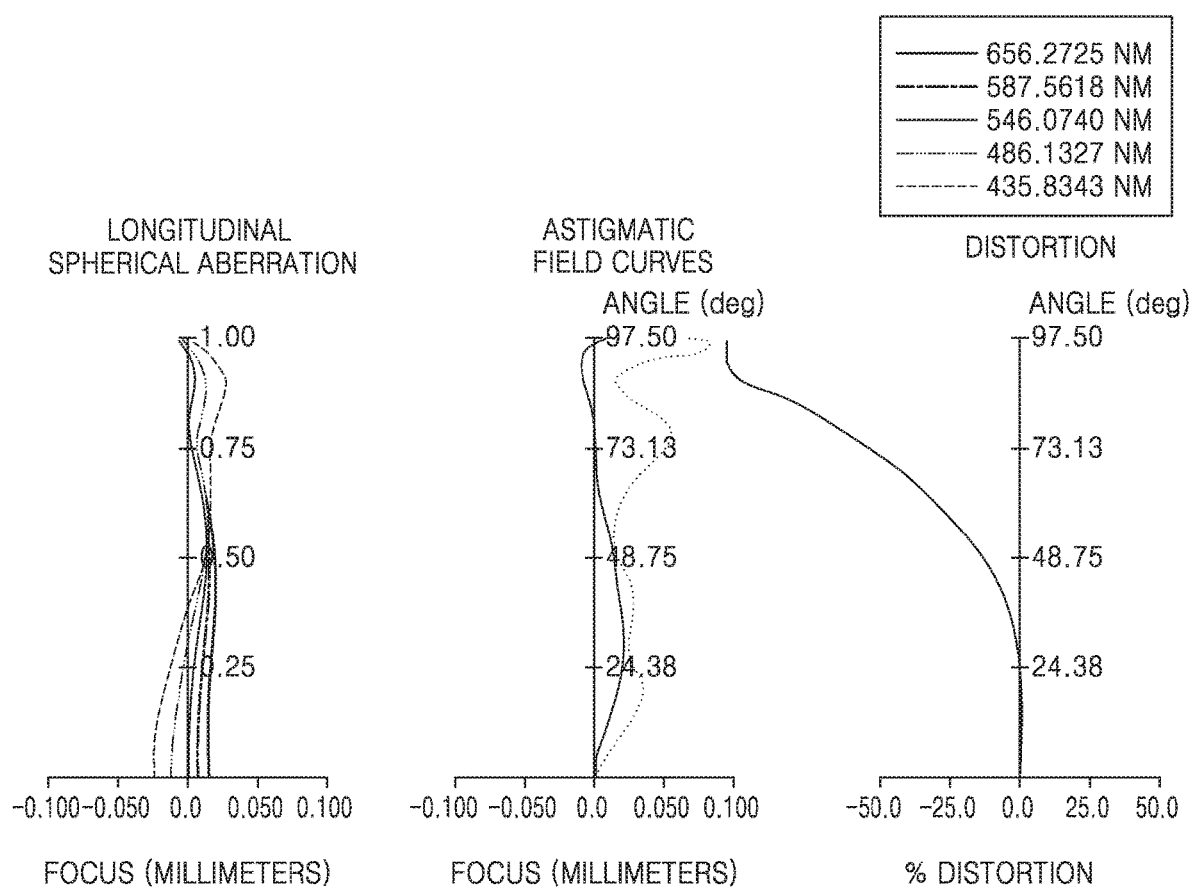
FIG. 8 illustrates an aberration diagram of the fisheye lens assembly according to the embodiment of a third numerical value among various embodiments.

FIG. 8 illustrates longitudinal spherical aberration, astigmatic field curves, and distortion of the fisheye lens assembly according to the third numeric value embodiment of the inventive concept.

Fourth Numeric Value Embodiment

FIG. 9 illustrates the fisheye lens assembly according to the fourth numeric value embodiment of various embodiments, and Table 10 illustrates design data of the fourth numeric value embodiment.

TABLE 10

| Lens surface | R (mm) | Dn (mm) | Nd | Vd |
|---|---|---|---|---|
| OBJ | infinity | infinity | | |
| 1* | 9.759 | 0.456 | 1.5312 | 56.5 |
| 2* | 1.750 | 0.561 | | |
| 3* | 3.431 | 0.275 | 1.5441 | 56.1 |
| 4* | 0.574 | 0.290 | | |
| 5* | 1.600 | 0.700 | 1.6504 | 21.5 |
| 6* | 9.985 | 0.068 | | |
| ST | Infinity | 0.067 | | |
| 8* | 2.859 | 0.437 | 1.5441 | 56.1 |
| 9* | −1.139 | 0.056 | | |
| 10* | −6.914 | 0.275 | 1.6504 | 21.5 |
| 11* | 3.107 | 0.010 | | |
| 12* | 7.291 | 0.796 | 1.5441 | 56.1 |
| 13* | −0.711 | 0.010 | | |
| 14* | 1.298 | 0.288 | 1.6504 | 21.5 |
| 15* | 0.788 | 0.300 | | |
| 16 | 1.00E+18 | 0.110 | 1.517 | 64.2 |
| 17 | 1.00E+18 | 0.629 | | |
| IMG | 1.00E+18 | 0.007 | | |

Table 11 illustrates aspherical coefficients in the fourth numeric value embodiment.

TABLE 11

| | K | A | B | C | D | E | F | G | H | J |
|---|---|---|---|---|---|---|---|---|---|---|
| 1* | −4.64.E−01 | 8.29.E−02 | −3.72.E−02 | 8.66.E−03 | −1.17.E−03 | 9.88.E−05 | −5.33.E−06 | 1.78.E−07 | −3.37.E−09 | 2.73.E−11 |
| 2* | −6.55.E−01 | 1.43.E−01 | −1.88.E−02 | −5.07.E−02 | 2.36.E−02 | −2.75.E−03 | −2.29.E−05 | 0.00.E+00 | 0.00.E+00 | 0.00.E+00 |
| 3* | −5.09.E+01 | 2.88.E−02 | −1.13.E−01 | 1.97.E−01 | −1.94.E−01 | 1.09.E−01 | −3.73.E−02 | 9.81.E−03 | −2.61.E−03 | 4.18.E−04 |
| 4* | −4.03.E−01 | −2.26.E−01 | −9.19.E−01 | 1.49.E+00 | −1.05.E+01 | 2.72.E+01 | −4.21.E+01 | 3.53.E+01 | −2.00.E+01 | −3.68.E+01 |
| 5* | 5.93.E−01 | 1.45.E−02 | −9.77.E−01 | 1.20.E+01 | −1.15E+02 | 6.50.E+02 | −2.19E+03 | 4.38.E+03 | −4.85.E+03 | 2.29.E+03 |
| 6* | 3.71.E+02 | 4.39.E−01 | −8.74.E−01 | 1.23.E+01 | −1.58.E+01 | 3.21.E−02 | 4.49.E−02 | −2.55.E−07 | 3.82.E−08 | −1.67.E−05 |
| 8* | −7.89.E−01 | 3.38.E−01 | −6.23.E−01 | 9.60.E−01 | 1.71.E−01 | −2.08.E−03 | −2.29.E−05 | 2.45.E−02 | −1.47.E−03 | 0.00.E+00 |
| 9* | −1.74.E+01 | −2.96.E+00 | 1.51.E+01 | −8.62.E+01 | 3.41.E+02 | −8.16.E+02 | 4.44.E+02 | 2.65.E+03 | −4.12.E+03 | 0.00.E+00 |
| 10* | −1.33.E−01 | −2.03.E+00 | 6.95.E+00 | −2.68.E+01 | 3.98.E+01 | −4.08.E+00 | −3.12.E−04 | 0.00.E+00 | 0.00.E+00 | 0.00.E+00 |
| 11* | 1.15.E+01 | 1.51.E−01 | −3.48.E+00 | −6.19.E+00 | 9.70.E+01 | −3.09.E+02 | 4.72.E+02 | −3.71.E+02 | 1.23.E+02 | 0.00.E+00 |
| 12* | −4.18.E+01 | 1.38.E+00 | −1.07.E+01 | 3.28.E+01 | −4.80.E+01 | 3.33.E+01 | −1.08.E+01 | 2.81.E+00 | 4.28.E+00 | −5.61.E+00 |
| 13* | −8.58.E−01 | 2.17.E−01 | 1.90.E+00 | −1.43.E+01 | 4.85.E+01 | −9.55.E+01 | 1.10.E+02 | −6.64.E+01 | 1.63.E+01 | 0.00.E+00 |
| 15* | −3.00.E+01 | 2.97.E−01 | −1.23.E+00 | 1.33.E+00 | −9.35.E−01 | 4.83.E−01 | −1.56.E−01 | 2.70.E−02 | −1.93.E−03 | 0.00.E+00 |
| 16* | −9.39.E+00 | 1.66.E−01 | −6.32.E−01 | 5.60.E−01 | −1.75.E−02 | −3.45.E−01 | 2.75.E−01 | −9.20.E−02 | 1.17.E−02 | 0.00.E+00 |

Table 12 illustrates an SAG value in the fourth numeric value embodiment.

TABLE 12

| Y | SAG (mm) |
|---|---|
| 0 | 0.000 |
| 0.02 | 0.000 |
| 0.04 | 0.001 |
| 0.06 | 0.001 |
| 0.08 | 0.002 |
| 0.1 | 0.004 |
| 0.12 | 0.005 |
| 0.14 | 0.007 |
| 0.16 | 0.009 |
| 0.18 | 0.011 |
| 0.2 | 0.014 |
| 0.22 | 0.016 |
| 0.24 | 0.019 |
| 0.26 | 0.022 |
| 0.28 | 0.025 |
| 0.3 | 0.028 |
| 0.32 | 0.032 |
| 0.34 | 0.035 |
| 0.36 | 0.038 |
| 0.38 | 0.042 |
| 0.4 | 0.045 |
| 0.42 | 0.049 |
| 0.44 | 0.052 |
| 0.46 | 0.056 |
| 0.48 | 0.059 |
| 0.5 | 0.062 |
| 0.52 | 0.065 |
| 0.54 | 0.068 |
| 0.56 | 0.070 |
| 0.58 | 0.072 |
| 0.6 | 0.074 |
| 0.62 | 0.075 |
| 0.64 | 0.076 |
| 0.66 | 0.076 |
| 0.68 | 0.076 |
| 0.7 | 0.075 |
| 0.72 | 0.073 |
| 0.74 | 0.072 |
| 0.76 | 0.068 |
| 0.78 | 0.064 |
| 0.8 | 0.059 |
| 0.82 | 0.053 |
| 0.84 | 0.047 |
| 0.86 | 0.039 |
| 0.88 | 0.030 |
| 0.9 | 0.021 |
| 0.92 | 0.010 |
| 0.94 | −0.001 |
| 0.96 | −0.013 |
| 0.98 | −0.026 |
| 1 | −0.040 |
| 1.02 | −0.054 |
| 1.04 | −0.069 |
| 1.06 | −0.085 |
| 1.08 | −0.100 |

Figure 10:
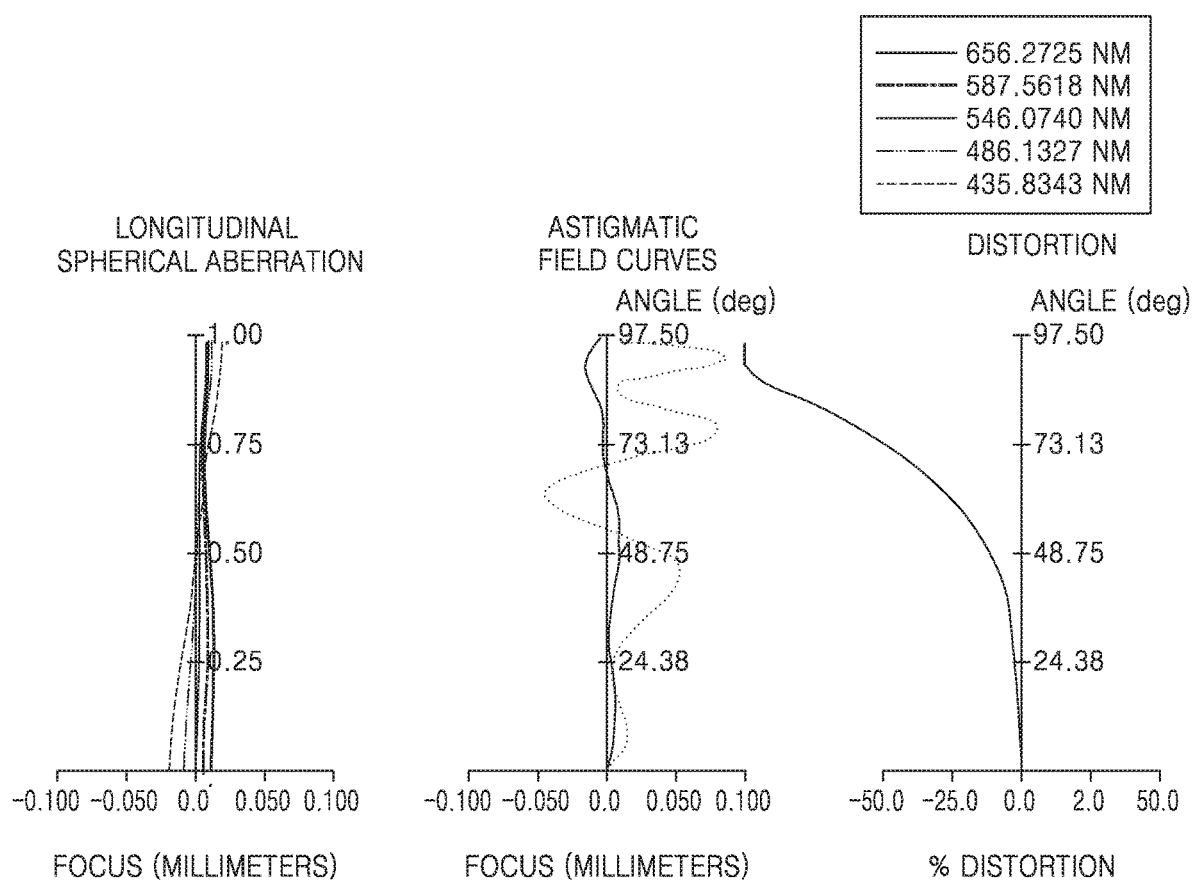
FIG. 10 illustrates an aberration diagram of the fisheye lens assembly according to the embodiment of a fourth numerical value among various embodiments.

FIG. 10 illustrates longitudinal spherical aberration, astigmatic field curves, and distortion of the fisheye lens assembly according to the fourth numeric value embodiment of various embodiments.

Table 13 illustrates numeric values for each conditional expression of a fisheye lens assembly according to various embodiments. Referring to Table 13, the fisheye lens assembly according to various embodiments may satisfy conditional expressions (1) to (7).

TABLE 13

| | FOV | SAG_MAX | TL/Y | TL_f/TL_r | CT_A/CT_B |
|---|---|---|---|---|---|
| First numeric value embodiment | 195° | 91 μm | 3.18 | 1.07 | 2.59 |
| Second numeric value embodiment | 195° | 132 μm | 2.71 | 0.77 | 2.65 |
| Third numeric value embodiment | 195° | 92 μm | 3.06 | 1.36 | 2.79 |
| Fourth numeric value embodiment | 195° | 100 μm | 2.96 | 1.21 | 2.76 |

The fisheye lens assembly according to various embodiments may be applied to, for example, an electronic apparatus employing an image sensor. The fisheye lens assembly according to an example embodiment may be applied to various electronic apparatuses such as a digital camera, an exchangeable lens camera, a video camera, a cellular phone camera, and a camera for a small-sized mobile device.

Figure 11:
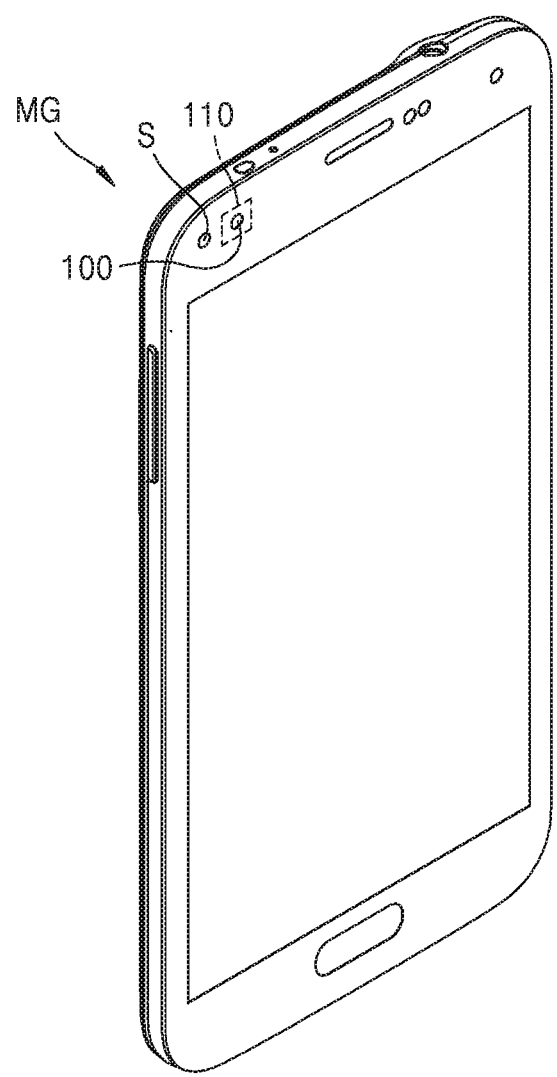
FIG. 11 is a perspective view of an electronic apparatus having a fisheye lens assembly, according to an example embodiment.

FIG. 11 is a perspective view of an electronic apparatus MG having a fisheye lens assembly, according to an example embodiment. FIG. 11 shows an example in which the electronic apparatus MG is applied to a mobile phone, but is not limited thereto. FIG. 11 shows the front of the mobile phone. The electronic apparatus MG may include at least one fisheye lens assembly 100 and an image sensor 110 configured to receive an image formed by the at least one fisheye lens assembly 100 and to convert the received image into an electrical image signal. As the fisheye lens assembly 100, the fisheye lens assemblies described with reference to FIGS. 1 to 10 may be employed. A photographing apparatus capable of photographing at high performance may be implemented by applying the fisheye lens assembly according to various embodiments to an electronic apparatus such as a small digital camera, a mobile phone, or an authentication device.

Figure 12:
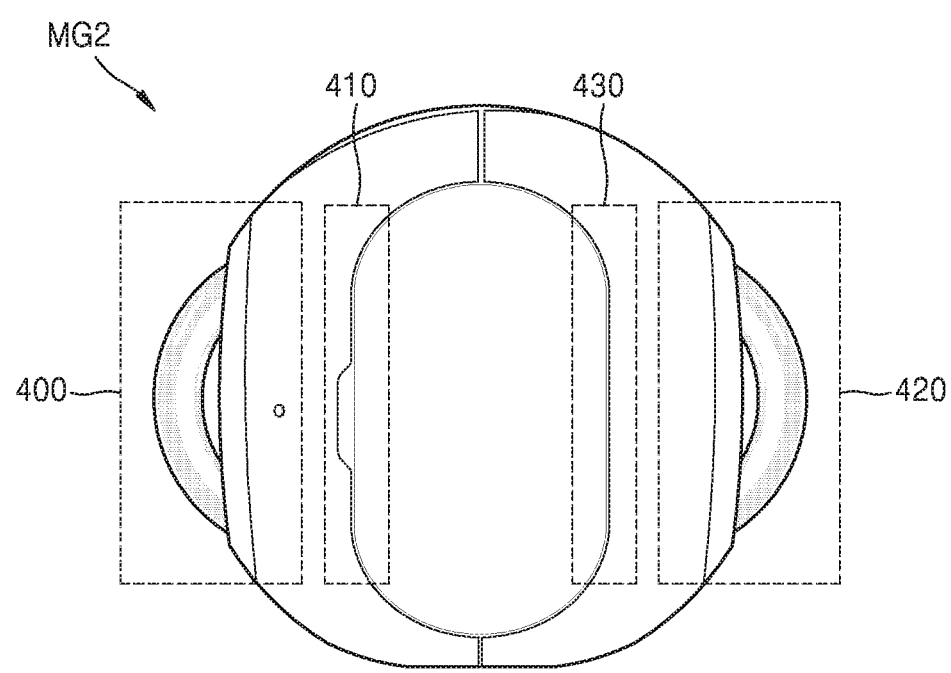
FIG. 12 is a top view of an electronic apparatus having a fisheye lens assembly, according to another example embodiment.

FIG. 12 is a top view of an electronic apparatus MG2 having a fisheye lens assembly, according to another example embodiment. FIG. 12 shows an example in which the electronic apparatus MG2 is applied to an omni-directional photographing camera, but is not limited thereto. The electronic apparatus MG2 may include a plurality of fisheye lens assemblies according to various embodiments. For example, a first fisheye lens assembly 400 and a second fisheye lens assembly 420 may be arranged so as to orient to opposite directions to each other. The electronic apparatus MG2 may include a first image sensor 410 configured to receive an image formed by the first fisheye lens assembly 400 and a second image sensor 430 configured to receive an image formed by the second fisheye lens assembly 420. Because various fisheye lens assemblies have an angle of view of 150° or more, the electronic apparatus MG2 may perform omni-directional photographing. A method of arranging fisheye lens assemblies, according to various embodiments, is not limited thereto, and two or more fisheye lens assemblies may be arranged in various methods. The fisheye lens assembly according to various embodiments may be applied to a mobile device, a virtual reality device, an augmented reality device, a surround view input device for a vehicle, and the like.

Figure 13:
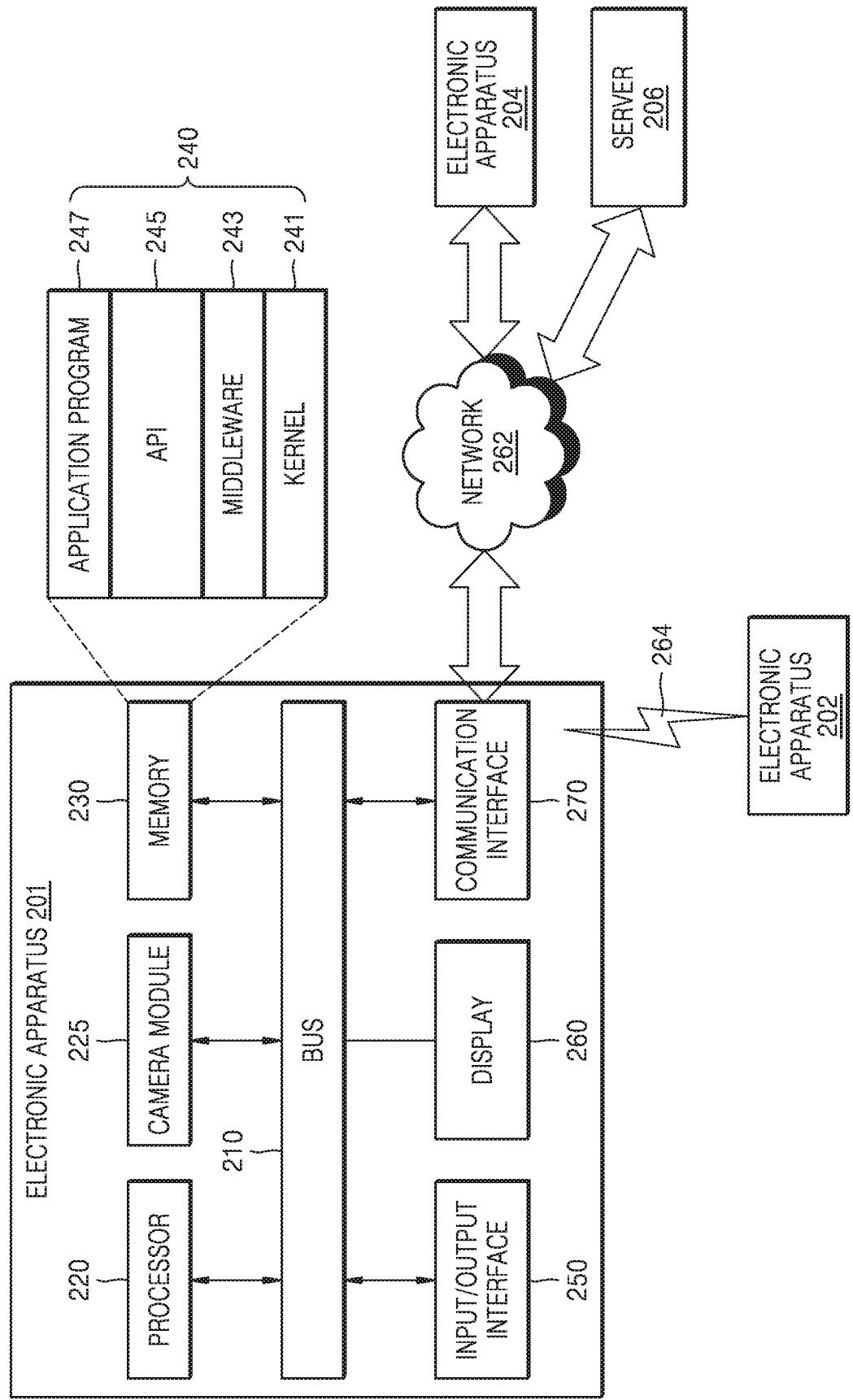
FIG. 13 is a block diagram of a network environment system according to various embodiments.

FIG. 13 is a block diagram of a network environment system according to various embodiments. Referring to FIG.

13, an electronic apparatus 201 in a network environment 200, according to various embodiments, is disclosed. The electronic apparatus 201 may include a bus 210, a processor 220, a camera module 225, a memory 230, an input/output interface 250, a display 260, and a communication interface 270. According to a certain embodiment, the electronic apparatus 201 may omit at least one of the elements or further include another element.

The bus 210 may include, for example, a circuit configured to connect the elements 210 to 270 and to deliver communication (e.g., a control message and/or data) between elements.

The processor 220 may include at least one of a CPU, an application processor (AP), or a communication processor (CP). The processor 220 may execute computation or data processing related to control and/or communication of at least one other element of the electronic apparatus 201.

The camera module 225 is, for example, a device capable of capturing a still image and a video, and according to an embodiment, the camera module 225 may include at least one image sensor (e.g., a front sensor or a rear sensor), a lens, an image signal processor (ISP), or a flash (e.g., a light-emitting diode (LED), a xenon lamp, or the like). Alternatively, the camera module 225 may photograph an iris of a user for user authentication. For example, an optical lens assembly according to various embodiments may be applied to the camera module 225.

The memory 230 may include volatile and/or non-volatile memories. The memory 230 may store, for example, a command or data related to at least one other element of the electronic apparatus 201. According to an embodiment, the memory 230 may store software and/or a program 240. The program 240 may include, for example, a kernel 241, middleware 243, an application programming interface (API) 245, an application program (or "application") 247, and/or the like. At least a portion of the kernel 241, the middleware 243, or the API 245 may be referred to as an operating system (OS).

The kernel 241, for example, may control or manage system resources (e.g., the bus 210, the processor 220, the memory 230, or the like) used to execute operations or functions implemented in other programs (e.g., the middleware 243, the API 245, or the application program 247). In addition, the kernel 241 may provide an interface configured to enable the middleware 243, the API 245, or the application program 247 to control or manage the system resources by accessing individual elements of the electronic apparatus 201.

The middleware 243 may, for example, mediate between the API 245 or the application program 247 and the kernel 241 such that the API 245 or the application program 247 gives and receives data to and from the kernel 241 through communication.

In addition, the middleware 243 may process, according to priority, one or more job requests received from the application program 247. For example, the middleware 243 may grant priority, by which the system resources (e.g., the bus 210, the processor 220, the memory 230, or the like) of the electronic apparatus 201, to at least one program of the application program 247. For example, the middleware 243 may perform scheduling or load balancing of the one or more job requests by processing the one or more job requests according to the priority granted to the at least one program.

The API 245 is, for example, an interface configured for the application 247 to control a function provided from the kernel 241 or the middleware 243 and may include, for example, at least one interface or function (e.g., instructions) for file control, window control, image processing, character control, or the like.

The input/output interface 250 may act as, for example, an interface capable of delivering a command or data input from a user or another external device to other element(s) of the electronic apparatus 201. In addition, the input/output interface 250 may output a command or data received from other element(s) of the electronic apparatus 201 to the user or another external device.

The display 260 may include, for example, a liquid crystal display (LCD), an LED display, an organic LED (OLED) display, a microelectromechanical systems (MEMS) display, or an electronic paper display. The display 260 may display various types of content (e.g., a text, an image, a video, an icon, a symbol. Or the like) to the user. The display 260 may include a touch screen and may receive a touch, gesture, proximity, or hovering input using, for example, an electronic pen or a part of the user's body.

The communication interface 270 may configure communication between the electronic apparatus 201 and an external device (e.g., a first external electronic apparatus 202, a second electronic apparatus 204, or a server 206). For example, the communication interface 270 may be connected to a network 262 through wireless communication or wired communication to communicate with an external device (e.g., the second electronic apparatus 204 or the server 206).

The wireless communication may use, for example, a cellular communication protocol, e.g., at least one of long-term evolution (LTE), LTE Advance (LTE-A), code division multiple access (CDMA), wideband CDMA (WCDMA), universal mobile telecommunications system (UTMS), Wireless Broadband (WiBro), or Global System for Mobile Communications (GSM). In addition, the wireless communication may include, for example, short-range communication 264. The short-range communication 164 may include at least one of, for example, wireless fidelity (WiFi), Bluetooth, near field communication (NFC), global navigation satellite system (GNSS), or the like. GNSS may include at least one of, for example, Global Positioning System (GPS), Global Navigation Satellite System (Glonass), Beidou Navigation Satellite System (hereinafter, "Beidou"), or Galileo, the European global satellite-based navigation system. Hereinafter, in the present document, "GPS" may be interchangeably used with "GNSS". The wired communication may include at least one of, for example, universal serial bus (USB), high definition multimedia interface (HDMI), recommended standard-232 (RS-232), plain old telephone service (POTS), or the like. The network 262 may include at least one of, for example, a telecommunications network, a computer network (e.g., local area network (LAN) or wide area network (WAN)), the Internet, or a telephone network.

Each of the first and second external electronic apparatuses 202 and 204 may be the same as or different from the electronic apparatus 201. According to an embodiment, the server 206 may include a group of one or more servers. According to various embodiments, all or some of operations executed by the electronic apparatus 201 may be executed by another one or a plurality of electronic apparatuses (e.g. the electronic apparatuses 202 and 204) or the server 206. According to an embodiment, when the electronic apparatus 201 is supposed to perform a certain function or service automatically or in response to a request, the electronic apparatus 201 may request at least a partial functions associated with the certain function or service from another device (e.g., the electronic apparatus 202 or 204 or the server 106 additionally or instead of autonomously executing the function or service. The other device (e.g., the electronic apparatus 202 or 204 or the server 106 may execute the request function or the additional function and transmit a result of the execution to the electronic apparatus 201. The electronic apparatus 201 may process the received result as it is or additionally and provide the requested function or service. To this end, for example, cloud computing, distributed computing, or client-server computing technology may be used.

Figure 14:
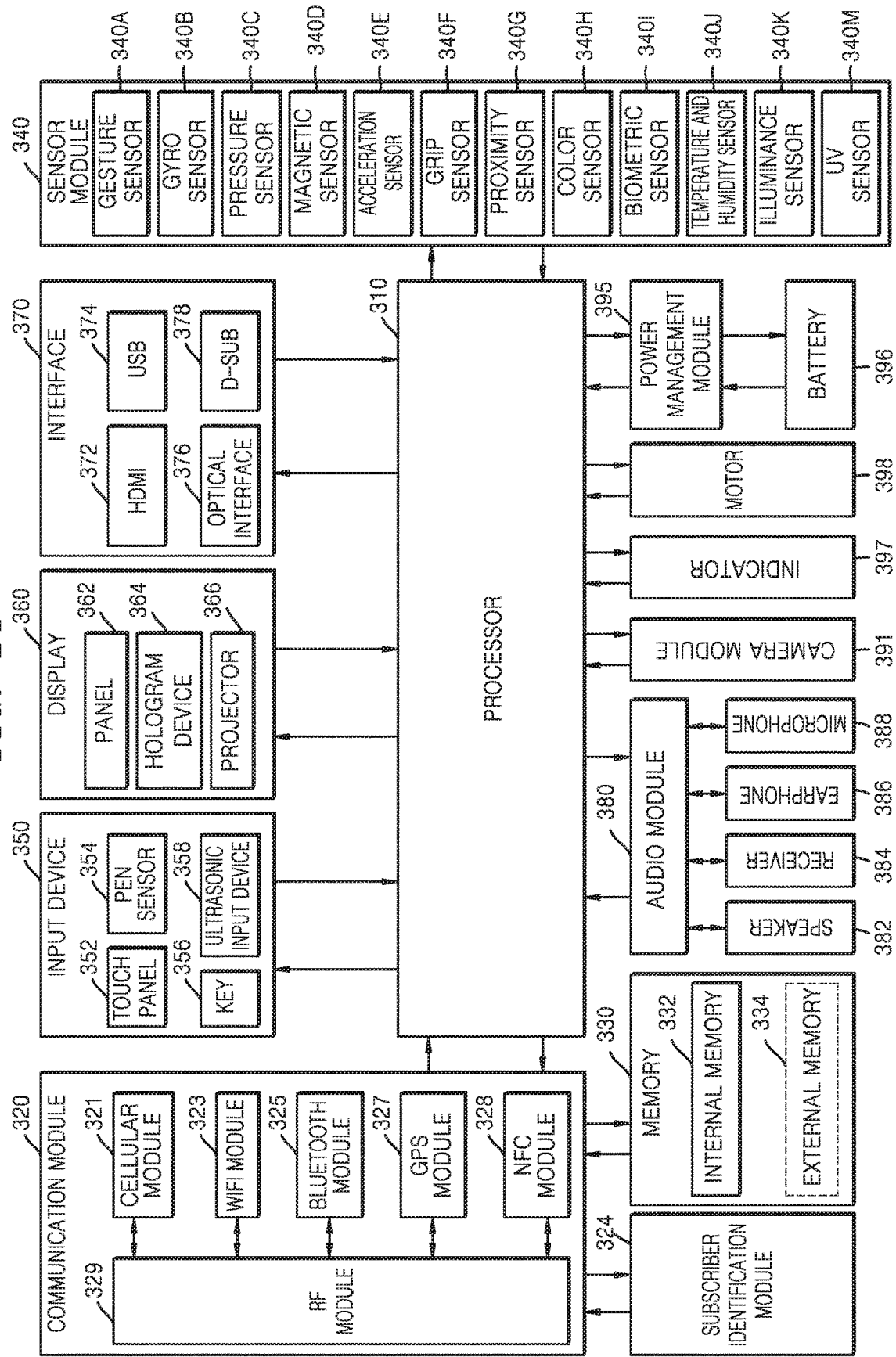
FIG. 14 is a block diagram of an electronic apparatus according to various embodiments.

FIG. 14 is a block diagram of an electronic apparatus 301 according to various embodiments. The electronic apparatus 301 may include, for example, all or some of the electronic apparatus 201 shown in FIG. 13. The electronic apparatus 301 may include at least one processor (e.g., AP) 310, a communication module 320, a subscriber identity module (SIM) 324, a memory 330, a sensor module 340, an input device 350, a display 360, an interface 370, an audio module 380, a camera module 391, a power management module 395, a battery 396, an indicator 397, and a motor 398.

The processor 310 may control a plurality of hardware or software elements connected to the processor 310, by driving an OS or an application program and perform various kinds of data processing and computation. The processor 310 may be implemented by, for example, a system on chip (SoC). According to an embodiment, the processor 310 may further include a graphic processing unit (GPU) and/or an image signal processor. The processor 310 may include at least some (e.g., a cellular module 321) of the elements shown in FIG. 14. The processor 310 may process a command or data received from at least one of other elements (e.g., a non-volatile memory) by loading the command or data in a volatile memory and store various data in the non-volatile memory.

The communication module 320 may have the same or similar configuration as the interface 270 of FIG. 13. The communication module 320 may include, for example, a cellular module 321, a WiFi module 323, a Bluetooth module 325, a GNSS module 327 (e.g., a GPS module, a Glonass module, a Beidou module, or Galileo module), an NFC module 328, and a radio frequency (RF) module 329.

The cellular module 321 may provide a voice call, a video call, a text service, or an Internet service through a communication network. According to an embodiment, the cellular module 321 may perform identification or authentication of the electronic apparatus 301 in the communication network by using the SIM (e.g., a SIM card) 324. According to an embodiment, the cellular module 221 may perform at least some of functions which the processor 310 may provide. According to an embodiment, the cellular module 321 may include a CP.

Each of the WiFi module 323, the Bluetooth module 325, the GNSS module 327, or the NFC module 328 may include, for example, a processor configured to process data transmitted and received through a corresponding module. According to a certain embodiment, at least some (e.g., two or more) of the cellular module 321, the WiFi module 323, the Bluetooth module 325, the GNSS module 327, or the NFC module 328 may be included in a single integrated chip (IC) or IC package.

The RF module 329 may transmit and receive, for example, a communication signal (e.g., an RF signal). The RF module 329 may include, for example, a transceiver, a power amplification module (PAM), a frequency filter, a low noise amplifier (LNA), an antenna, or the like. According to another embodiment, at least one of the cellular module 321, the WiFi module 323, the Bluetooth module 325, the GNSS module 327, or the NFC module 328 may transmit and receive an RF signal through a separate RF module.

The SIM 324 may include, for example, a card including an SIM and/or an embedded SIM and include unique identification information (e.g., integrated circuit card identifier (ICCID)) or subscriber information (e.g., international mobile subscriber identity (IMSI)).

The memory 330 (e.g., memory 330) may include an internal memory 332 or an external memory 334. The internal memory 332 may include at least one of, for example, a volatile memory (e.g., dynamic random access memory (DRAM), static RAM (SRAM), synchronous DRAM (SDRAM), or the like) or a non-volatile memory (e.g., one time programmable read-only memory (OTPROM), programmable ROM (PROM), erasable and programmable ROM (EPROM), electrically erasable and programmable ROM (EEPROM), mask ROM, flash ROM, a flash memory (e.g., a NAND flash, a NOR flash, or the like), a hard drive, or a solid state drive (SSD)).

The external memory 334 may further include a flash drive, for example, a compact flash (CF) card, a secure digital (SD) card, a micro secure digital (Micro-SD) card, a mini secure digital (Mini-SD) card, an extreme digital (xD) card, a multi-media card (MMC), a memory stick, or the like. The external memory 334 may be functionally and/or physically connected to the electronic apparatus 301 through various interfaces.

The sensor module 340 may, for example, measure a physical quantity or detect an operating state of the electronic apparatus 301 and convert the measured or detected information into an electrical signal. The sensor module 340 may include at least one of, for example, a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (e.g., red, green, blue (RGB) sensor), a biometric sensor 340I, a temperature/humidity sensor 340J, an illuminance sensor 340K, or an ultraviolet (UV) sensor 340M. Additionally or alternatively, the sensor module 340 may include, for example, an E-nose sensor, an electromyography (EMG) sensor, an electroencephalogram (EBG) sensor, an electrocardiogram (ECG) sensor, an IR sensor, an iris sensor and/or a fingerprint sensor. The sensor module 340 may further include a control circuit configured to control at least one of the sensors described above. According to a certain embodiment, the electronic apparatus 301 may control the sensor module 340 while the processor 310 is in a sleep state, by further including a processor configured to control the sensor module 340 as a portion of the processor 310 or separately.

The input device 350 may include, for example, a touch panel 352, a (digital) pen sensor 354, a key 356, or an ultrasonic input device 358. The touch panel 352 may use at least one scheme among, for example, a capacitive overlay scheme, a resistive overlay scheme, an IR beam scheme, or an ultrasonic scheme. In addition, the touch panel 352 may further include a control circuit. The touch panel 352 may further include a tactile layer to provide a tactile response to a user.

The (digital) pen sensor 354 may include, for example, a recognition sheet that is a part of the touch pane) or a separate recognition sheet. The key 356 may include, for example, a physical button, an optical key, or a keypad. The ultrasonic input device 358 may detect an ultrasonic wave generated by an input tool, through a microphone (e.g., a microphone 388), and check data corresponding to the detected ultrasonic wave.

The display 360 (e.g., the display 360) may include a panel 362, a hologram device 364, or a projector 366. The panel 362 may include the same or similar configuration as the display 260 of FIG. 21. The panel 362 may be implemented to be, for example, flexible, transparent, or wearable. The panel 362 may be configured as one module with the touch panel 352. According to an embodiment, the panel 362 may include a pressure sensor (or a force sensor) capable of measuring a strength of pressure according to a touch of the user. The pressure sensor may be implemented in one body with the touch panel 352 or implemented as one or more sensors separately from the touch panel 352. The hologram device 364 may display a stereoscopic image in the air by using interference of light. The projector 366 may display an image by projecting light on a screen. The screen may be located at, for example, the inside or the outside of the electronic apparatus 301. According to an embodiment, the display 360 may further include a control circuit configured to control the panel 362, the hologram device 364, or the projector 366.

The interface 370 may include, for example, an HDMI 372, a USB 374, an optical interface 376, or a D-subminiature (D-sub) 378. The interface 370 may be included in, for example, the communication interface 370 shown in FIG. 22. Additionally or alternatively, the interface 370 may include, for example, a mobile high-definition link (MHL) interface, an SD card/MMC interface, or an infrared data association (IrDA) standard interface.

The audio module 380 may bi-directionally convert, for example, a sound and an electrical signal. At least some elements of the audio module 380 may be included in, for example, the input/output interface 245 shown in FIG. 22. The audio module 380 may process, for example, a speaker 382, a receiver 384, earphones 386, the microphone 388, or the like.

The camera module 391 is, for example, a device capable of capturing a still image and a video, and according to an embodiment, the camera module 391 may include at least one image sensor (e.g., a front sensor or a rear sensor), a lens, an ISP, or a flash (e.g., an LED, a xenon lamp, or the like). For example, an optical lens assembly according to various embodiments may be applied to the camera module 391.

The power management module 395 may, for example, manage power of the electronic apparatus 301. The electronic apparatus 301 may receive power through a battery but is not limited thereto. According to an embodiment, the power management module 395 may include a power management integrated circuit (PMIC), a charger IC, or a battery or fuel gauge. The PMIC may have a wired and/or wireless charging scheme. The wireless charging scheme may include, for example, a magnetic resonance scheme, a magnetic induction scheme, an electromagnetic wave scheme, or the like and may further include an additional circuit, for example, a coil loop, a resonance circuit, a rectifier, or the like. The battery gauge may measure, for example, a remaining capacity of the battery 396 or a voltage, a current, or a temperature of the battery 396 during charging. The battery 396 may include, for example, a rechargeable battery and/or a solar battery.

The indicator 397 may indicate a specific state of the electronic apparatus 301 or a portion thereof (e.g., the processor 310), for example, a booting state, a message state, a charging state, or the like. The motor 398 may convert an electrical signal into mechanical vibration and generate vibration, a haptic effect, or the like. Although not shown, the electronic apparatus 301 may include a processing unit (e.g., GPU) configured to support a mobile TV. The processing unit configured to support a mobile TV may process media data conforming to a standard such as digital multimedia broadcasting (DMB), digital video broadcasting (DVB), or mediaFlo™.

A fisheye lens assembly according to an embodiment includes a plurality of lenses sequentially arranged from an object side to an image sensor side and has an angle of view of 150° or more, wherein the plurality of lenses include an aspherical lens having an inflection point on one surface or both surfaces thereof, and the aspherical lens is located at the most image sensor side among the plurality of lenses and satisfies expressions below $35\ \mu m \leq SAG\_MAX$, $1.4 \leq Nd \leq 1.7$, and $10 \leq Abv \leq 60$, where SAG_MAX denotes a maximum value of absolute values of SAG values of inflection points of the aspherical lens, Nd denotes a refractive index, and Abv denotes an Abbe number.

For example, the fisheye lens assembly may satisfy an expression below $1.5 \leq TL/Y \leq 6$, where TL denotes a distance from an object-side surface of a lens located at the most object side among the plurality of lenses to an image plane of an image sensor, and Y denotes an image height.

For example, the plurality of lenses may include a front group, an iris, and a rear group sequentially arranged from the object side to the image sensor side, the front group may sequentially include a first lens having negative refractive power and a second lens having negative refractive power from the object side, and the rear group may include the aspherical lens.

For example, the front group may further include a third lens provided closer to the image sensor side than the second lens and having positive refractive power, the rear group may further sequentially include a fourth lens having positive refractive power, a fifth lens having negative refractive power, and a sixth lens having positive refractive power from the object side, and the aspherical lens may be provided closer to the image sensor side than the sixth lens.

For example, the fisheye lens assembly may satisfy an expression below $0.5 \leq TL\_f/TL\_r \leq 1.25$, where TL_f denotes a distance from an object-side surface of a lens located at the most object side in the front group to an image plane-side surface of a lens located at the most image sensor side in the front group, and TL_r denotes a distance from an object-side surface of a lens located at the most object side in the rear group to an image plane-side surface of a lens located at the most image sensor side in the rear group.

For example, the rear group may further include a lens provided closer to the object side than the aspherical lens and having positive refractive power and satisfy an expression below $1.25 \leq CT\_A/CT\_B \leq 4$, where CT_A denotes a central thickness of the lens having positive refractive power, and CT_B denotes a central thickness of the aspherical lens.

For example, the front group may include at least three lenses, and the rear group may include at least three lenses.

For example, the fisheye lens assembly may further include a driver configured to move all of the plurality of lenses or move the plurality of lenses excluding the first lens when focusing.

For example, the fisheye lens assembly may further include a sensor configured to sense a change in a temperature, wherein the driver corrects focusing according to the change in the temperature sensed by the sensor.

For example, the first lens and the second lens may have a meniscus shape convex toward the object side.

For example, the fisheye lens assembly may further include an optical device between the aspherical lens and the image sensor.

For example, all of the plurality of lenses may be aspherical lenses.

A fisheye lens assembly according to another embodiment includes: a front group including three or more lenses arranged from an object side to an image sensor side; an iris; and a rear group including an aspherical lens having a lens surface having an inflection point and satisfies expressions below. $1.5 \leq TL/Y \leq 6$ and $FOV \geq 150°$, where TL denotes a distance from an object-side surface of a lens located at the most object side among the lenses in the front group to an image plane of an image sensor, Y denotes an image height, and FOV denotes an angle of view.

For example, the fisheye lens assembly may satisfy expressions below $35 \, \mu m \leq SAG\_MAX$, $1.4 \leq Nd \leq 1.7$, and $10 \leq Abv \leq 60$, where SAG_MAX denotes a maximum value of absolute values of SAG values of inflection points of the aspherical lens, Nd denotes a refractive index in a d-line, and Abv denotes an Abbe number.

For example, the front group may sequentially include a first lens having negative refractive power, a second lens having negative refractive power, and a third lens having positive refractive power from the object side.

For example, the fisheye lens assembly may satisfy an expression below $0.5 \leq TL\_f/TL\_r \leq 1.25$, where TL_f denotes a distance from an object-side surface of a lens located at the most object side in the front group to an image plane-side surface of a lens located at the most image sensor side in the front group, and TL_r denotes a distance from an object-side surface of a lens located at the most object side in the rear group to an image plane-side surface of a lens located at the most image sensor side in the rear group.

For example, the rear group may further sequentially include a fourth lens having positive refractive power, a fifth lens having negative refractive power, and a sixth lens having positive refractive power from the object side, and the aspherical lens may be provided closer to the image sensor side than the sixth lens.

For example, the fisheye lens assembly may satisfy an expression below $1.25 \leq CT\_A/CT\_B \leq 4$, where CT_A denotes a central thickness of the sixth lens, and CT_B denotes a central thickness of the aspherical lens.

For example, the fisheye lens assembly may move all of the plurality of lenses or move the plurality of lenses excluding the first lens when focusing.

An electronic apparatus according to an embodiment includes: at least one fisheye lens assembly; and at least one image sensor configured to receive light formed by the at least one fisheye lens assembly, wherein the fisheye lens assembly includes a plurality of lenses sequentially arranged from an object side to an image sensor side and has an angle of view of 150° or more, the plurality of lenses include an aspherical lens having an inflection point on one surface or both surfaces thereof, and the aspherical lens is located at the most image sensor side among the plurality of lenses and satisfies expressions below $35 \, \mu m \leq SAG\_MAX$, $1.4 \leq Nd \leq 1.7$, and $10 \leq Abv \leq 60$, where SAG_MAX denotes a maximum value of absolute values of SAG values of inflection points of the aspherical lens, Nd denotes a refractive index, and Abv denotes an Abbe number.

Each of elements described in the present document may include one or more components, and a name of a corresponding element may vary depending on a type of an electronic apparatus. According to various embodiments, the electronic apparatus may include at least one of the elements described in the present document and may omit some elements or may further include additional other elements. In addition, according to various embodiments, some of the elements of the electronic apparatus may be combined to configure one entity, thereby enabling the functions of corresponding elements before the combination to be performed in the same manner.

The term "module" used in the present document may indicate a unit including one or more combinations of, for example, hardware, software, or firmware. "Module" may be interchangeably used with the term, for example, unit, logic, logical block, component, circuit, or the like. "Module" may be a minimum unit of an integrated component or a portion of the minimum unit. "Module" may be a minimum unit configured to perform one or more functions or a portion of the minimum unit. "Module" may be implemented mechanically or electronically. For example, "module" may include at least one of an application-specific integrated circuit (ASIC) chip, field-programmable gate arrays (FPGAs), or a programmable-logic device, configured to perform certain operations, known or to be developed.

At least a portion of apparatuses (e.g., modules or functions thereof) or methods (e.g., operations) according to various embodiments may be implemented by, for example, instructions stored in computer-readable storage media in the form of a program module. When the instructions are executed by a processor (e.g., the processor 220 of FIG. 13), the one or more processors may perform functions corresponding to the instructions. The computer-readable storage media may be, for example, the memory 230.

A computer-readable recording medium may include hard discs, floppy discs, magnetic media (e.g., magnetic tapes), optical recording media (e.g., compact disc-read only memories (CD-ROMs), digital versatile discs (DVDs), magneto-optical media (e.g., floptical discs), hardware devices (e.g., ROMs, RAMs, or flash memories), or the like. In addition, program commands may include a high-level language code that may be executed by a computer using an interpreter as well as a machine language code made by a complier. The hard devices described above may be configured to operate as one or more software modules to perform operations according to various embodiments, and vice versa. A module or a program module according to various embodiments may include at least one of the elements described above, omit some thereof, or further include additional other elements. Operations performed by a module, a program module, or another element, according to various embodiments, may be executed by sequential, parallel, repetitive, or heuristic methods. In addition, some operations may be executed in another order, be omitted, or further include other operations. In addition, the embodiments disclosed in the present document are provided for description and understanding of disclosed technical features and do not limit the technical scope described in the present document. Therefore, it should be analyzed that the scope of the present document includes all modifications or various other embodiments based on the technical idea of the present document. The embodiments described above are only illustrative, and those of ordinary skill in the art may derive various modified and equivalent other embodiments from the embodiments described above. Therefore, the true technical scope for which protection is sought, according to the embodiments of the inventive concept, shall be defined by the technical idea of the inventive concept set forth in the following claims.

The invention claimed is:

1. A fisheye lens assembly comprising:
a plurality of lenses sequentially arranged from an object side to an image sensor side and having an angle of view of 150° or more,
wherein the plurality of lenses comprise an aspherical lens having an inflection point on one surface or both surfaces thereof,
wherein the aspherical lens is located closest to the image sensor side among the plurality of lenses and satisfies the expressions below:

$$35\ \mu m \leq SAG\_MAX,$$

$$1.4 \leq Nd \leq 1.7, \text{ and}$$

$$10 \leq Abv \leq 60,$$

where SAG_MAX denotes a maximum value of absolute values of SAG values of inflection points of the aspherical lens, Nd denotes a refractive index, and Abv denotes an Abbe number,
wherein the plurality of lenses further comprise a front group, an iris, and a rear group, sequentially arranged from the object side to the image sensor side,
wherein the front group sequentially comprises, from the object side, a first lens having negative refractive power and a second lens having negative refractive power, and
wherein the rear group comprises the aspherical lens.

2. The fisheye lens assembly of claim 1, wherein the fisheye lens assembly satisfies the expression below:

$$1.5 \leq TL/Y \leq 6,$$

where TL denotes a distance from an object-side surface of a lens located closest to the object side among the plurality of lenses to an image plane of an image sensor, and Y denotes an image height.

3. The fisheye lens assembly of claim 1,
wherein the front group further comprises a third lens provided closer to the image sensor side than the second lens and having positive refractive power,
wherein the rear group further comprises a fourth lens having positive refractive power, a fifth lens having negative refractive power, and a sixth lens having positive refractive power, sequentially from the object side, and
wherein the aspherical lens is provided closer to the image sensor side than the sixth lens.

4. The fisheye lens assembly of claim 1, wherein the fisheye lens assembly satisfies the expression below:

$$0.5 \leq TL\_f/TL\_r \leq 1.25,$$

where TL_f denotes a distance from an object-side surface of a lens located closest to the object side in the front group to an image plane-side surface of a lens located closest to the image sensor side in the front group, and TL_r denotes a distance from an object-side surface of a lens located closest to the object side in the rear group to an image plane-side surface of a lens located closest to the image sensor side in the rear group.

5. The fisheye lens assembly of claim 1,
wherein the rear group further comprises a lens provided closer to the object side than the aspherical lens and having positive refractive power, and
wherein the rear group satisfies the expression below:

$$1.25 \leq CT\_A/CT\_B \leq 4,$$

where CT_A denotes a central thickness of the lens having positive refractive power, and CT_B denotes a central thickness of the aspherical lens.

6. The fisheye lens assembly of claim 1,
wherein the front group comprises at least three lenses, and
wherein the rear group comprises at least three lenses.

7. The fisheye lens assembly of claim 1, further comprising a driver configured to move all of the plurality of lenses or move the plurality of lenses excluding the first lens, when focusing is performed.

8. The fisheye lens assembly of claim 7, further comprising a sensor configured to sense a change in a temperature,
wherein the driver corrects focusing according to the change in the temperature sensed by the sensor.

9. The fisheye lens assembly of claim 1, wherein the first lens and the second lens have a meniscus shape convex toward the object side.

10. The fisheye lens assembly of claim 1, further comprising an optical device between the aspherical lens and the image sensor.

11. The fisheye lens assembly of claim 1, wherein all of the plurality of lenses are aspherical lenses.

12. An electronic apparatus comprising:
at least one fisheye lens assembly of claim 1; and
at least one image sensor configured to receive light formed by the at least one fisheye lens assembly.

* * * * *